US009064283B2

(12) United States Patent
Scanlon et al.

(10) Patent No.: US 9,064,283 B2
(45) Date of Patent: Jun. 23, 2015

(54) SYSTEMS, METHODS, AND APPARATUS FOR REVIEWING FILE MANAGEMENT

(75) Inventors: James T. Scanlon, Tariffville, CT (US); Xiaowei Zhu, Avon, CT (US); Maryann Godbout, Wethersfield, CT (US); Song Chen, Glastonbury, CT (US)

(73) Assignee: The Travelers Indemnity Company, Hartford, CT (US)

( * ) Notice: Subject to any disclaimer, the term of this patent is extended or adjusted under 35 U.S.C. 154(b) by 404 days.

(21) Appl. No.: 13/431,941

(22) Filed: Mar. 27, 2012

(65) Prior Publication Data
US 2013/0262473 A1      Oct. 3, 2013

(51) Int. Cl.
*G06F 17/30*   (2006.01)
*G06Q 40/02*   (2012.01)

(52) U.S. Cl.
CPC .............. *G06Q 40/02* (2013.01); *G06Q 40/025* (2013.01)

(58) Field of Classification Search
CPC ................................................. G06F 17/30648
USPC ....................... 707/748, 603, 999.001, E17.01
See application file for complete search history.

(56) References Cited

U.S. PATENT DOCUMENTS 8,135,712 B1 * 3/2012 Coladonato et al. .......... 707/730
8,671,449 B1 * 3/2014 Nachenberg .................... 726/24
2001/0027455 A1 * 10/2001 Abulleil et al. ............... 707/102
2010/0076965 A1 * 3/2010 Kamada et al. ............... 707/728
2010/0305978 A1 * 12/2010 Hogan et al. ...................... 705/4
2013/0073322 A1 * 3/2013 Virdhagriswaran .............. 705/4

OTHER PUBLICATIONS

Thomas L. Saaty, "Decision-making with the AHP: Why is the principal eigenvector necessary", European Journal of Operational Research 145, 2003, 85-91.
Thomas L. Saaty, "A scaling method for priorities in hierarchical structures", Journal of Mathematical Psychology 15, 1977, 234-281.
Thomas L. Saaty, "Axiomatic foundation of the analytic hierarchy process", Management Science, vol. 32, No. 7, Jul. 1986, 841-855.
Thomas L. Saaty, "An exposition of the AHP in reply to the paper 'Remarks on the analytic hierarchy process'", Management Science, vol. 36, No. 3, Mar. 1990, 259-268.

* cited by examiner

*Primary Examiner* — Phong Nguyen
(74) *Attorney, Agent, or Firm* — Michael D. Downs; Fincham Downs LLC

(57) ABSTRACT

Systems, apparatus, methods and articles of manufacture provide for reviewing the management of one or more business files. According to some embodiments, methods may include determining a plurality of file review criteria, determining a plurality of file review questions, determining a respective maximum potential review score for each file review question, determining respective responses for the file review questions, adjusting (if necessary) one or more of the maximum potential review scores, and/or determining at least one review score for each file review question answered. Some embodiments may provide for determining a respective review score for a file for each of one or more predetermined file review criteria.

17 Claims, 27 Drawing Sheets

| PHASE | Q# | FILE REVIEW QUESTION | QUESTION CREDITS | FOUNDATION PERCENTAGES | | | | FOUNDATION CREDITS | | | |
|---|---|---|---|---|---|---|---|---|---|---|---|
| | | | | CE | TS | IA | FS | CE | TS | IA | FS |
| INVESTIGATION | 4 | WAS PERTINENT/FACTUAL INFORMATION OBTAINED AND DOCUMENTED IN THE CLAIM FILE? | 0.167 | | 60% | 40% | | | 0.100 | 0.067 | |
| | 5 | DID THE CLAIM FILE CONTAIN QUALITY PHOTOS THAT WERE PROPERLY LABELED? | 0.133 | | 100% | | | | 0.133 | | |
| | 6 | WAS THE LOSS DATA ACCURATELY CAPTURED IN THE CLAIM FILE? | 0.133 | | | 100% | | | | 0.133 | |
| | 7 | WAS THE LOSS DATA ACCURATELY CAPTURED IN THE WAS MEANINGFUL GUIDANCE AND ASSISTANCE PROVIDED TO OUR CUSTOMER?CLAIM FILE? | 0.167 | 100% | | | | 0.167 | | | |
| | 8 | WAS THE CAUSE OF LOSS PROPERLY DETERMINED AND DOCUMENTED TO SUPPORT THE COVERAGE DECISIONS? | 0.167 | | 60% | 40% | | | 0.100 | 0.067 | |
| | 9 | WERE THE APPROPRIATE RESOURCES UTILIZED TO ASSIST IN THE INVESTIGATION? | 0.133 | | 30% | 20% | 50% | | 0.040 | 0.027 | 0.067 |
| | 10 | WAS SUBROGATION POTENTIAL RECOGNIZED AND INVESTIGATED TO ENABLE THE SUCCESSFUL PURSUIT OF RECOVERY IN PARTNERSHIP WITH THE RECOVERY CENTER? | 0.100 | | 40% | 60% | | | 0.040 | 0.060 | |
| | | | 1.000 | | | | | 0.167 | 0.413 | 0.353 | 0.067 |

| PHASES | TOPICS | FOUNDATION PERCENTAGES 910 | | | | CREDIT | FOUNDATION CREDITS 912 | | | |
|---|---|---|---|---|---|---|---|---|---|---|
| | 904 | ENGAGEMENT | TECH EXPERTISE | INFO ACCURACY | STRATEGY | | ENGAGEMENT | TECH EXPERTISE | INFO ACCURACY | STRATEGY |
| ASSIGNMENT | CORE ASSIGNMENT | 85% | 0% | 0% | 15% | 0.050 | 0.043 | 0.000 | 0.000 | 0.008 |
| | REASSIGNMENT/REFERRAL | 88% | 0% | 0% | 12% | 0.050 | 0.044 | 0.000 | 0.000 | 0.006 |
| COVERAGE | CORE COVERAGE | 10% | 88% | 2% | 0% | 0.250 | 0.025 | 0.220 | 0.005 | 0.000 |
| | COVERAGE ISSUES | 0% | 72% | 0% | 28% | 0.250 | 0.000 | 0.180 | 0.000 | 0.070 |
| | RESERVATION OF RIGHTS/DISCLAIMERS | 8% | 31% | 47% | 15% | 0.125 | 0.009 | 0.038 | 0.059 | 0.019 |
| | EXCESS EXPOSURE | 22% | 63% | 0% | 15% | 0.250 | 0.055 | 0.158 | 0.000 | 0.038 |
| | OTHER INSURANCE | 0% | 62% | 7% | 31% | 0.250 | 0.000 | 0.155 | 0.018 | 0.078 |
| | UM/UIM | 0% | 100% | 0% | 0% | 0.125 | 0.000 | 0.125 | 0.000 | 0.000 |
| | GARAGE/DEALERSHIP | 32% | 68% | 0% | 0% | 0.250 | 0.080 | 0.170 | 0.000 | 0.000 |
| | INTERNAL/EXTERNAL RESOURCE-COVERAGE | 0% | 30% | 0% | 70% | 0.175 | 0.000 | 0.053 | 0.000 | 0.123 |
| INVESTIGATION | CORE INVESTIGATION | 13% | 48% | 25% | 14% | 0.250 | 0.033 | 0.119 | 0.063 | 0.035 |
| | SUBROGATION/CONTRIBUTION | 0% | 65% | 5% | 31% | 0.250 | 0.000 | 0.161 | 0.013 | 0.076 |
| | ARN | 0% | 0% | 100% | 0% | 0.050 | 0.000 | 0.000 | 0.050 | 0.000 |
| | FRAUD (INCLUDING ARSON) | 0% | 50% | 0% | 50% | 0.075 | 0.000 | 0.038 | 0.000 | 0.038 |
| | TOTAL LOSS | 0% | 62% | 0% | 38% | 0.500 | 0.000 | 0.310 | 0.000 | 0.190 |
| | FIRE/THEFT | 0% | 35% | 50% | 15% | 0.075 | 0.000 | 0.026 | 0.038 | 0.011 |
| | ADDITIONAL EXPOSURES | 0% | 70% | 0% | 30% | 0.250 | 0.000 | 0.175 | 0.000 | 0.075 |
| | INTERNAL/EXTERNAL RESOURCE-INVESTIGATION | 0% | 37% | 0% | 63% | 0.075 | 0.000 | 0.028 | 0.000 | 0.047 |
| EVALUATION | CORE EVALUATION | 11% | 66% | 11% | 12% | 0.250 | 0.027 | 0.165 | 0.029 | 0.030 |
| | INTERNAL/EXTERNAL RESOURCE-EVALUATION | 0% | 37% | 0% | 63% | 0.100 | 0.000 | 0.037 | 0.000 | 0.063 |
| RESOLUTION | CORE RESOLUTION | 25% | 44% | 12% | 20% | 0.200 | 0.050 | 0.088 | 0.023 | 0.039 |
| | INTER-COMPANY ARBITRATION | 0% | 100% | 0% | 0% | 0.100 | 0.000 | 0.100 | 0.000 | 0.000 |
| | CLAIM PROFESSIONAL COMPLIANCE | 0% | 100% | 0% | 0% | 0.160 | 0.000 | 0.160 | 0.000 | 0.000 |
| | MANAGEMENT INVOLVEMENT | 0% | 10% | 0% | 90% | 0.200 | 0.000 | 0.020 | 0.000 | 0.180 |
| | SAC-BASIC | 70% | 30% | 0% | 0% | 0.200 | 0.140 | 0.060 | 0.000 | 0.000 |
| | INTERNAL/EXTERNAL RESOURCE-RESOLUTION | 0% | 37% | 0% | 63% | 0.060 | 0.000 | 0.022 | 0.000 | 0.038 |

SINGLE FILE RATING: PHASE LEVEL SCORES

| TOPIC | Q | QUESTION CREDITS | ADJUSTED CREDITS (MAXIMUM SCORE) | | | | ACTUAL SCORE | | | |
|---|---|---|---|---|---|---|---|---|---|---|
| | | | ENGAGEMENT | TECH EXP | INFO ACCU | STRATEGY | ENGAGEMENT | TECH EXP | INFO ACCU | STRATEGY |
| INVESTIGATION – CORE | 4 | 0.128 | | 0.077 | 0.051 | | | 0.077 | 0.051 | |
| | 5 | 0.103 | | 0.103 | | | | 0.000 | | |
| | 6 | 0.103 | | | 0.103 | | | | 0.103 | |
| | 7 | 0.128 | 0.128 | | | | 0.128 | | | |
| | 8 | 0.128 | | 0.077 | 0.051 | | | 0.077 | 0.051 | |
| | 9 | 0.103 | | 0.031 | 0.021 | 0.051 | | 0.031 | 0.021 | 0.051 |
| 1502 | 10 | 0.077 | | 0.031 | 0.046 | | | 0.031 | 0.046 | |
| | SUM | (0.077) | 0.128 | 0.318 | 0.272 | 0.051 | 0.128 | 0.216 | 0.272 | 0.051 |
| | | | | | PERCENTAGE | | 100% | 68% | 100% | 100% |

| TOPIC | Q | QUESTION CREDITS | ADJUSTED CREDITS (MAXIMUM SCORE) | | | | ACTUAL SCORE | | | |
|---|---|---|---|---|---|---|---|---|---|---|
| | | | ENGAGEMENT | TECH EXP | INFO ACCU | STRATEGY | ENGAGEMENT | TECH EXP | INFO ACCU | STRATEGY |
| FRAUD/ARSON | 1 | 0.115 | | 0.081 | | 0.035 | | 0.081 | | 0.035 |
| 1504 | 2 | 0.115 | | 0.035 | | 0.081 | | 0.000 | | 0.000 |
| | SUM | (0.230) | 0.000 | 0.115 | 0.000 | 0.115 | 0.000 | 0.081 | 0.000 | 0.035 |
| | | | | | PERCENTAGE | | NA | 70% | NA | 30% |

INVESTIGATION 1.000
FRAUD/ARSON .230
CORE .770
1501

INVESTIGATION PHASE (COMBINED TOPICS) 1506

| ADJUSTED CREDITS (MAXIMUM SCORE) | | | |
|---|---|---|---|
| ENGAGEMENT | TECH EXP | INFO ACCU | STRATEGY |
| 0.128 | 0.433 | 0.272 | 0.166 |

| ACTUAL SCORE | | | |
|---|---|---|---|
| ENGAGEMENT | TECH EXP | INFO ACCU | STRATEGY |
| 0.128 | 0.296 | 0.272 | 0.086 |

| PERCENTAGE 1508 | | | |
|---|---|---|---|
| ENGAGEMENT | TECH EXP | INFO ACCU | STRATEGY |
| 100% | 68% | 100% | 52% |

| CLAIM: 999 AD CDI2345 J | SAC: N | STATE: CT | LOSS DATE: 10/15/1997 |
|---|---|---|---|
| CLAIMANT: FILE LEVEL | | | STATUS: ACTIVE |
| INSURED: ABC CORP. | | | LOGON OFFICE: 629 ▶ |

FILE REVIEW - 000 ×

FILE REVIEW SELECTION SCREEN

NEW REVIEW

| LINE OF BUSINESS: | REVIEW TYPE: | | QUESTIONNAIRE: |
|---|---|---|---|
| AUTO ▶ | SELF ▶ | | PHYSICAL DAMAGE ▶ |

• REVIEWER:  PRIMARY REVIEWEE: *  PRIMARY REVIEWEE STATUS:
629 – EOMALLEY  ▶  OPEN ▶

CREATE    PRINT

EXISTING REVIEWS

| REVIEW TYPE | QUESTIONNAIRE | REVIEW STATUS | LAST UPDATE DATE | REVIEWER | REVIEW DATE | FINANCIAL/ SIGNIFICANT | PRIMARY REVIEWER | CLAIMANT NUMBER | CLAIMANT NAME |
|---|---|---|---|---|---|---|---|---|---|
| SELF | AUTO PHYSICAL DAMAGE | RATED | 09/14/2011 | EOMALLEY | 09/14/2011 | RESOLVED | JTREMBLA | 000 | FILE LEVEL |
| SELF | AUTO MEDICAL FPM | CANCELED | 09/11/2011 | EOMALLEY | | | JPETERS4 | 000 | FILE LEVEL |
| SELF | AUTO TOTAL LOSS | RATED | 09/11/2011 | EOMALLEY | 09/11/2011 | RESOLVED | JPETERS4 | 000 | FILE LEVEL |
| VALIDATION OFFICE | AUTO MEDICAL FPM | COMPLETED | 08/14/2011 | EOMALLEY | 08/14/2011 | | EOMALLEY | 000 | FILE LEVEL |
| COMMENTARY | AUTO GENERAL | COMPLETED | 08/14/2011 | EOMALLEY | 08/14/2011 | RESOLVED | JPETERS4 | 000 | FILE LEVEL |
| FOCUS OFFICE | AUTO PHYSICAL DAMAGE | RATED | 07/10/2011 | EOMALLEY | 07/10/2011 | | JPETERS4 | 000 | FILE LEVEL |
| MANAGERIAL | AUTO TOTAL LOSS | RATED | 07/10/2011 | EOMALLEY | 07/10/2011 | RESOLVED | JTREMBLA | 000 | FILE LEVEL |

MODIFY  VIEW  VALIDATE  FINANCIAL/SIGNIFICANT  CANCEL REVIEW  PRINT REVIEW

| CLAIM: 999 AD CDI2345 J    SAC: N    STATE: CT    LOSS DATE: 10/15/1997 |
| CLAIMANT: FILE LEVEL                              STATUS: ACTIVE |
| INSURED: ABC CORP.                      LOGON OFFICE: 629 ▶ |

FILE REVIEW - 000*
FILE REVIEW – SELF PROPERTY GENERAL
QUESTIONNAIRE * | FINANCIAL/SIGNIFICANT | REVIEW INFORMATION
JUMP TO: OVERALL COMMENT | ASSIGNMENT 0 OF 5 | COVERAGE 0 OF 3 | INVESTIGATION 0 OF 9 | EVALUATION 0 OF 19 | RESOLUTION 0 OF 12
COMPLEXITY: REASSIGNMENT AND REFERRAL
ASSIGNMENT ▶
☑ THIS PHASE IS APPLICABLE TO THE REVIEW
☑ AT INITIAL ASSIGNMENT, WAS THE CLAIM ASSIGNED TO A CLAIM PROFESSIONAL WITH THE PROPER SKILL SET?
  ENGAGEMENT                STRATEGY                               • CLAIM PROFESSIONAL:
  ⊙ MEETS  ○ DOES NOT MEET   ⊙ MEETS  ○ DOES NOT MEET                 629 – JPETERS4 ▶
  COMMENT
  THE PROPER ASSIGNMENT TO OUR MOST EXPERIENCED CLAIM HANDLER WAS RECOGNIZED AND EXECUTED UPON

☑ AT INITIAL ASSIGNMENT, WAS THE CLAIM ASSIGNED IN A TIMELY MANNER?
  ENGAGEMENT                STRATEGY                               • CLAIM PROFESSIONAL:
  ⊙ MEETS  ○ DOES NOT MEET   ⊙ MEETS  ○ DOES NOT MEET                 629 – JPETERS4 ▶
  COMMENT
  WITHIN 8 HOURS OF THE FIRST NOTICE OF LOSS, THE CLAIM WAS ASSIGNED, WHICH IS WELL WITHIN OUR OFFICE GOALS.

☑ REASSIGNMENT AND REFERRAL
☑ WAS THE NEED FOR REASSIGNMENT IDENTIFIED AND WAS THE CLAIM ROUTED TO THE RIGHT CLAIM PROFESSIONAL? IF MEETS,
  ENGAGEMENT       TECHNICAL SKILL          STRATEGY                • CLAIM PROFESSIONAL:
  ⊙ MEETS  ○ DOES NOT MEET  ○ DOES NOT MEET   ⊙ MEETS  ○ DOES NOT MEET   629 – JPETERS4 ▶
  COMMENT
  WHILE REASSIGNMENT WAS PROPERLY IDENTIFIED, THE NATURE OF THE CLAIM CALLED FOR A DIFFERENT SKILLED CLAIM PROFESSIONAL.

[ SPELL CHECK ] [ PEND ] [ COMPLETE ] [ CANCEL REVIEW ] [ GO TO SELECTION ]

FIG. 19

| CLAIM: 999 AD CDI2345 J | SAC: N | STATE: CT | LOSS DATE: 10/15/1997 |
| CLAIMANT: FILE LEVEL | | | STATUS: ACTIVE |
| INSURED: ABC CORP. | | | LOGON OFFICE: 629 ▶ |

FILE REVIEW - 000*
FILE REVIEW – SELF PROPERTY GENERAL
QUESTIONNAIRE * | FINANCIAL/SIGNIFICANT | REVIEW INFORMATION
JUMP TO: OVERALL COMMENT | ASSIGNMENT 0 OF 5 | COVERAGE 0 OF 3 | INVESTIGATION 0 OF 9 | EVALUATION 0 OF 19 | RESOLUTION 0 OF 12
COMPLEXITY: REASSIGNMENT AND REFERRAL                                              EXPAND ALL | COLLAPSE ALL
☑ RE * QUESTION WITH DOES NOT MEET SELECTED REQUIRES COMMENT.
☑ WAS THE NEED FOR REASSIGNMENT IDENTIFIED AND WAS THE CLAIM ROUTED TO THE RIGHT CLAIM PROFESSIONAL? IF MEETS,
 ENGAGEMENT          TECHNICAL SKILL         STRATEGY                 • CLAIM PROFESSIONAL:
 ⊙MEETS ○DOES NOT MEET  ○MEETS ⊙DOES NOT MEET  ⊙MEETS ○DOES NOT MEET     629 – JPETERS4 ▼
 * QUESTION HAS UNANSWERED FOUNDATIONS.

☑ WAS THE CLAIM REASSIGNED IN A TIMELY MANNER?
 ENGAGEMENT          STRATEGY                                         • CLAIM PROFESSIONAL:
 ○MEETS ⊙DOES NOT MEET  ○MEETS ⊙DOES NOT MEET                             629 – JPETERS4 ▼
 COMMENT
 * QUESTION HAS UNANSWERED FOUNDATIONS.

☑ WAS THE INSURED/REPRESENTATIVE INFORMED OF THE REASSIGNMENT AND WERE THE REASONS FOR THE CHANGE EXPLAINED?
 ENGAGEMENT                                                           • CLAIM PROFESSIONAL:
 ○MEETS ⊙DOES NOT MEET                                                    629 – JPETERS4 ▼
 COMMENT

[SPELL CHECK] [PEND] [COMPLETE] [CANCEL REVIEW] [GO TO SELECTION]

1900

| CLAIM: 999 AD CDI2345 J | SAC: N | STATE: CT | LOSS DATE: 10/15/1997 |
|---|---|---|---|
| CLAIMANT: FILE LEVEL | | | STATUS: ACTIVE |
| INSURED: ABC CORP. | | | LOGON OFFICE: 629 ▶ |

FILE REVIEW - 000 ×
FILE REVIEW – SELF PROPERTY GENERAL
QUESTIONNAIRE * | FINANCIAL/SIGNIFICANT * | REVIEW INFORMATION
FINANCIAL/SIGNIFICANT FOLLOW UP

| IDENTIFY REASON: * | FIRST NOTIFICATION DATE: |
|---|---|
| PAYMENT – OVER ▶ | |
| CLAIM HANDLER NOTIFIED: | SUPERVISOR NOTIFIED: |

REASON COMMENTS: * ABC ✓
PAYMENT TO INSURED EXCEEDED MAXIMUM GUIDELINE LIMITS BY > 5%

| ☑ RESOLVED | FINANCIAL AMOUNT: |
|---|---|
| RESOLVED DATE: | $2,500.00 |
| | RESOLVED BY: |

RESOLVED COMMENTS: * ABC ✓
INSURED NOTIFIED: REIMBURSEMENT RECEIVED IN FORM OF RETURNED CHECK. INSURED AWAITING NEW PAYMENT CHECK (ETA: 2-3 BUSINESS DAYS)

[ SAVE ]  [ GO TO SELECTION ]

| CLAIM: 999 AD CDI2345 J | SAC: N | STATE: CT | LOSS DATE: 10/15/1997 |
| CLAIMANT: FILE LEVEL | | | STATUS: ACTIVE |
| INSURED: ABC CORP. | | | LOGON OFFICE: 629 ▸ |

FILE REVIEW - 000*
FILE REVIEW – SELF AUTO PHYSICAL DAMAGE | REVIEW INFORMATION
OUTCOME SUMMARY | FINANCIAL/SIGNIFICANT
JUMP TO: RESPONSE SUMMARY | OUTCOME SUMMARY | SUMMARY DETAIL | OVERALL AND PHASE COMMENTS          EXPAND ALL | COLLAPSE ALL

RESPONSE SUMMARY ▸

| PHASES | TOTAL RESPONSES | MEETS | DOES NOT MEET | PHASE RESPONSES | QUESTION COMMENTS |
|---|---|---|---|---|---|
| ASSIGNMENT | 3 | 3 | 0 | 100% | 2 |
| COVERAGE | 4 | 3 | 1 | 75% | 1 |
| INVESTIGATION | 0 | 0 | 0 | PHASE IS NOT APPLICABLE | 0 |
| EVALUATION | 0 | 0 | 0 | PHASE IS NOT APPLICABLE | 0 |
| RESOLUTION | 0 | 0 | 0 | PHASE IS NOT APPLICABLE | 0 |
| ALL PHASES | | | | 25% | 3 |

▨ TOTAL RESPONSES MEET      ☐ TOTAL RESPONSES DOES NOT MEET

RESPONSE % EQUALS TOTAL NUMBER OF "MEETS" DIVIDED BY TOTAL NUMBER OF QUESTIONS (OPPORTUNITIES)

OUTCOME SUMMARY ▴
SUMMARY DETAIL ▴
OVERALL AND PHASE COMMENTS ▾

OVERALL
OVERALL PLEASED WITH HANDLING OF THIS CLAIM
ASSIGNMENT
VERY PLEASED WITH HOW THIS CLAIM WAS ASSIGNED.
COVERAGE
NO COMMENTS WERE ENTERED

[ GO TO SELECTION ]

2100

SYSTEMS, METHODS, AND APPARATUS FOR REVIEWING FILE MANAGEMENT

BACKGROUND

Some types of service providers, manufacturers, retailers and other companies and enterprises may review or otherwise consider the files, accounts, matters, and/or other information units they use for managing business information. In some instances, management of such files may be reviewed for compliance, for example, with internal policies, state regulations, and/or federal regulations. In other instances, files may be reviewed for one or more of a variety of other business purposes, including assessing the financial health of an enterprise and/or the quality of internal workflow processes or customer service processes. In one example, an insurance provider may, from time to time, review files including information corresponding to claims submitted (e.g., by an insured or injured person) against an insurance policy, in order to determine, e.g., how well the claim is being handled by the insurance provider, the claim professional(s) handling the file, and/or the responsible business unit of the insurance provider. Yet, despite the importance to companies of reviewing various types of files and/or accounts and the like (e.g., financial accounts, client matters, insurance claims), previous practices have failed to optimize the workflow, information collected, and analysis to increase the accuracy, consistency, and reliability of such file reviews.

BRIEF DESCRIPTION OF THE DRAWINGS

An understanding of embodiments described in this disclosure and many of the attendant advantages may be readily obtained by reference to the following detailed description when considered with the accompanying drawings, wherein:

FIG. 8 is a questionnaire design model according to some embodiments of the present invention;

FIG. 9 is a file review design model according to some embodiments of the present invention;

FIG. 15 depicts a review scoring model according to some embodiments of the present invention;

FIG. 17 depicts an example user interface according to some embodiments of the present invention;

FIG. 18 depicts an example user interface according to some embodiments of the present invention;

FIG. 19 depicts an example user interface according to some embodiments of the present invention;

FIG. 20 depicts an example user interface according to some embodiments of the present invention;

FIG. 21 depicts an example user interface according to some embodiments of the present invention.

DETAILED DESCRIPTION

Figure 1A:
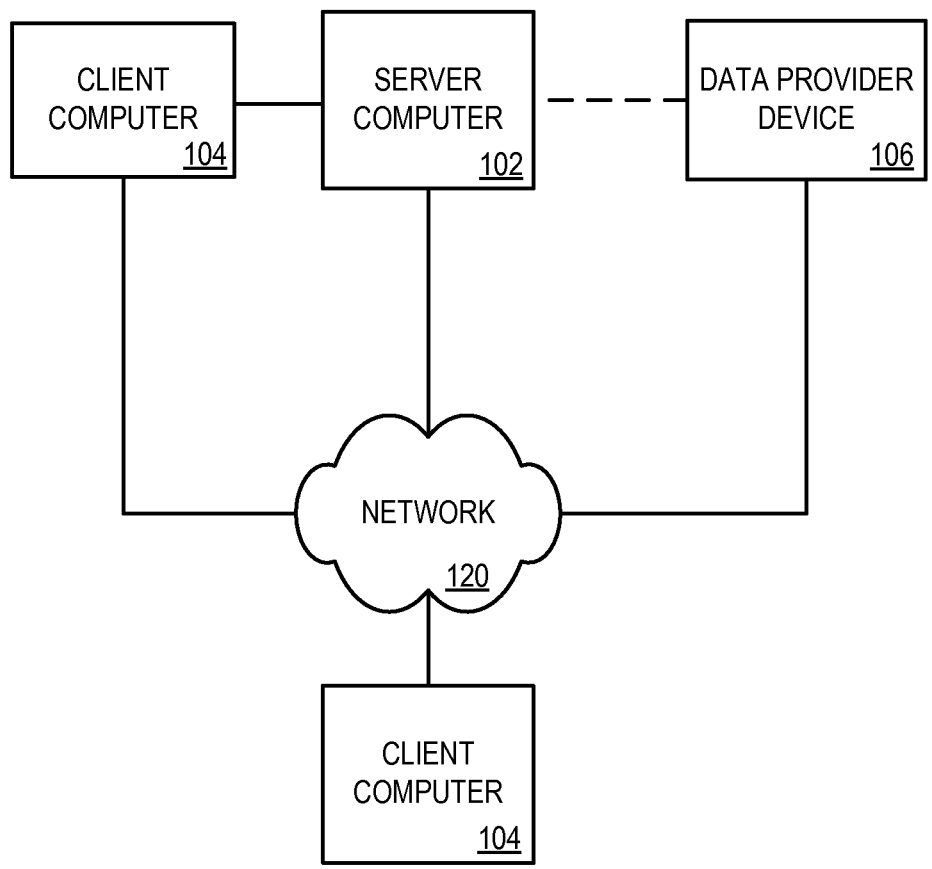
FIG. 1A is a diagram of a system according to some embodiments of the present invention.

FIG. 1A depicts a block diagram of an example system 100 for facilitating review of business files and/or workflows (e.g., handling of insurance claim files) according to some embodiments. Although reference may be made in this disclosure to examples of reviewing files, or reviewing workflows, it will be readily understood that disclosed embodiments may be useful with respect to reviewing files and/or reviewing workflows. The system 100 may comprise one or more client computers 104 in communication with a controller or server computer 102 (e.g., a computer specially programmed to provide for one or more of the functions described in this disclosure) via a network 120. Typically a processor (e.g., one or more microprocessors, one or more microcontrollers, one or more digital signal processors) of a client computer 104 or server computer 102 will receive instructions (e.g., from a memory or like device), and execute those instructions, thereby performing one or more processes defined by those instructions. Instructions may be embodied in, for example, one or more computer programs and/or one or more scripts.

In some embodiments a server computer 102 and/or one or more of the client computers 104 stores and/or has access to data useful for facilitating review of business files and/or workflows. Such information may include, in some embodiments, one or more of: file information, customer or client information, audit information (e.g., for determining whether a user may access and/or review a file, and/or for tracking changes to a file and/or to review response data for a file), questionnaire data, response data, notifications information (e.g., for transmitting one or one messages based on one or more conditions), and claim information (e.g., costs paid for one or more past medical injury claims, a claim number, a name of an insured, a name of an injured worker or other claimant, a name of a claim professional handling an insurance claim).

According to some embodiments, any or all of such data may be stored by or provided via one or more optional data provider devices 106 of system 100. A data provider device 106 may comprise, for example, an external hard drive or flash drive connected to a server computer 102, a remote computer system of a data provider entity for storing and serving data for use in determining settlement negotiation information and scenarios, or a combination of such remote and local data devices.

A data provider entity (e.g., a party other than an owner and/or operator, etc., of the server computer 102, client computer 104, other than an end-user of the data) may act, for example, as a vendor collecting data on behalf of the owner, a marketing firm, government agency and/or regulatory body, and/or demographic data gathering and/or processing firm. Any raw data, processed data, proprietary analysis and/or metrics may be stored on and/or via the data provider device 106. In one embodiment, one or more companies and/or end users may subscribe to or otherwise purchase data (e.g., jurisdiction-specific information and/or demographics data) from a data provider entity and receive the data from the data provider entity and/or via the data provider device 106.

In some embodiments, the server computer 102 may store some or all of the program instructions for reviewing files, and a client computer 104, such as a computer workstation or terminal of a business professional (e.g., a claim professional of an insurance company), may execute the file review application remotely via the network 120, and/or download from the server computer 102 (e.g., a web server) some or all of the program code for executing one or more of the various functions described in this disclosure. In some embodiments, a client computer 104 is used to execute a file review application, stored locally on the client computer 104, that accesses information stored on, or provided via, the server computer 102 and/or network 120. In one embodiment, a user may use the file review application to review information about a file (e.g., an insurance claim file) and/or rate the handling of the file, or other workflow process.

In one embodiment, a server computer may not be necessary or desirable. For example, some embodiments described in this disclosure may be practiced on one or more devices without a central authority. In such an embodiment, any functions described in this disclosure as performed by a server computer and/or data described as stored on a server computer may instead be performed by or stored on one or more such devices. Additional ways of distributing information and program instructions among one or more client computers 104 and/or server computers 102 will be readily understood by one skilled in the art upon contemplation of the present disclosure.

Figure 1B:
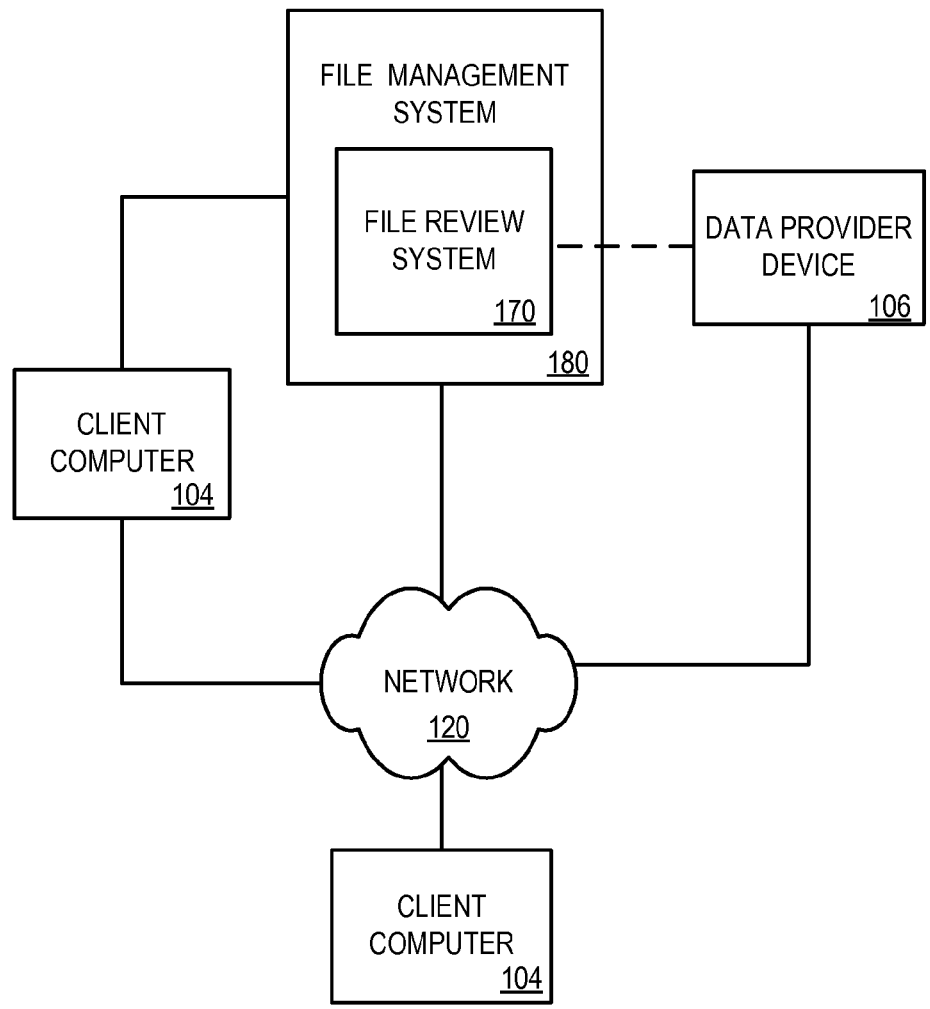
FIG. 1B is a diagram of a system according to some embodiments of the present invention.

FIG. 1B depicts a block diagram of another example system 150 according to some embodiments. The system 150 may comprise one or more client computers 104 in communication with a file management system 180 (such as may be hosted by, for example, a server computer 102) via a network 120. A file review system 170 is integrated into the file management system 180, for example, as a module, portal, or other functionality accessible through the file management system 180. In one embodiment, information about a particular file stored by the file management system 180 may be provided advantageously to the file review system 170. For example, stored information about an insurance file (e.g., an insurance claim number), an injured claimant (e.g., age, state of residence), a claim professional, and/or an insured (e.g., an employer of an injured worker) may be accessible by the file review system 170 without requiring manual input (e.g., by a claim professional, by a user reviewing the work of one or more professionals). As discussed above with respect to system 100 of FIG. 1A, in some embodiments one or more data provider devices 106 may store information that may be useful in reviewing one or more business files.

Figure 1C:
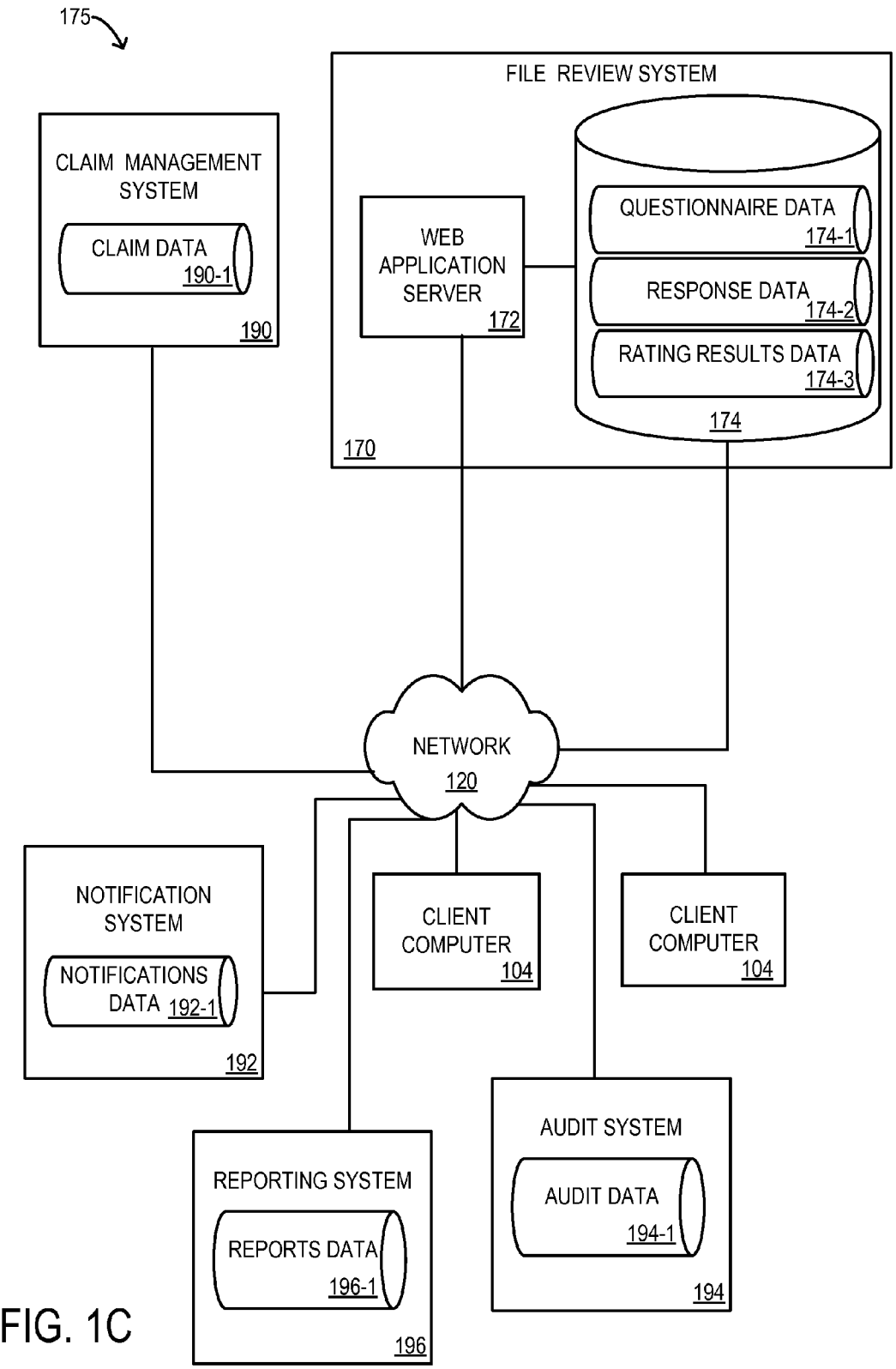
FIG. 1C is a diagram of a system according to some embodiments of the present invention.

FIG. 1C depicts a block diagram of another example system 175 according to some embodiments. The system 175 may comprise one or more client computers 104 in communication with a file review system 170 which may include a web application server 172 for providing a file review application (e.g., via an interface of a user computer 104) and/or a file review database 174, via a network 120. The system 175 may comprise one or more of a claim management system 190 (e.g., including claim data 190-1), a notification system 192 (e.g., including notifications data 192-1), an audit system 194 (e.g., including audit data 194-1) and/or a reporting system 196 (e.g., including reports data 196-1), any one or more of which systems may be in communication with one or more client computers 104, file review system 170, web application server 172, and/or file review database 174, directly and/or via network 120. Any one or more of claim management system 190, notification system 192, audit system 194, and reporting system 196 may comprise one or more processors, controllers, server computers, and/or web application servers, that may be useful in receiving and responding to requests for data maintained and/or accessible via the respective system(s).

In one embodiment, users may be able to enter data using a client computer 104, and/or data may be generated by one or more programs or applications running on and/or accessed by the client computer 104 and/or web application server 172, which data may be transmitted to and/or stored by one or more of the client computer 104, claim management system 190, notification system 192, audit system 194, reporting system 196, and/or file review system 174. For example, a user may enter via an interface of client computer 104 claim information that is stored with claim data 190-1, notification information that is stored with notifications data 192-1, audit information that is stored with audit data 194-1, questionnaire information (e.g., questions for conducting a file review, phases for categorizing actions, questions and/or responses, foundations for categorizing actions, questions and/or responses) that is stored with questionnaire data 174-1, response information (e.g., responses to file review questions) that is stored with response data 174-2, and/or rating results information 174-3 (e.g., detail and summary rating results from rating a file review) that is stored with rating results data 174-3.

In some embodiments, any of various types of information about a particular file, stored by one or more of the other systems of system 175, may be provided advantageously to file review system 170, the web application server 172, and/or file review database 174. For example, stored claim information about an insurance file (e.g., an insurance claim number), an injured claimant (e.g., age, state of residence), a claim professional, and/or an insured (e.g., an employer of an injured worker) may be accessible by and/or transmitted to file review system 170, web application server 172, and/or file review database 174, without requiring manual input (e.g., by a claim professional, by a user reviewing the work of one or more professionals). As discussed above with respect to system 100 of FIG. 1A, in some embodiments system 175 may include one or more data provider devices that may store and/or provide information that may be useful in reviewing one or more business files.

In some embodiments, at least some of questionnaire data 174-1, response data 174-2, and/or rating results data 174-3 may be transmitted (e.g., via network 120) or otherwise made accessible to a reporting system 196. In some embodiments, at least some of questionnaire data 174-1, response data 174-2, and/or rating results data 174-3 may be replicated and/or transferred to the reporting system 196 (e.g., for storage in reports data 196-1). In one embodiment, any such information stored in reports data 196-1 may be aggregated and/or formatted specifically for use with predefined reports of the reporting system 196. In some embodiments, reporting system 196 allows users to access one or more reports (e.g., predefined and/or user-created reports) over the network 120 via a user interface of a client computer 104. Such reports may include any queries, formats, and/or styles as deemed appropriate for a particular business purpose, and may be used, for example, in evaluating file quality and/or file handling workflow quality.

Figure 2:
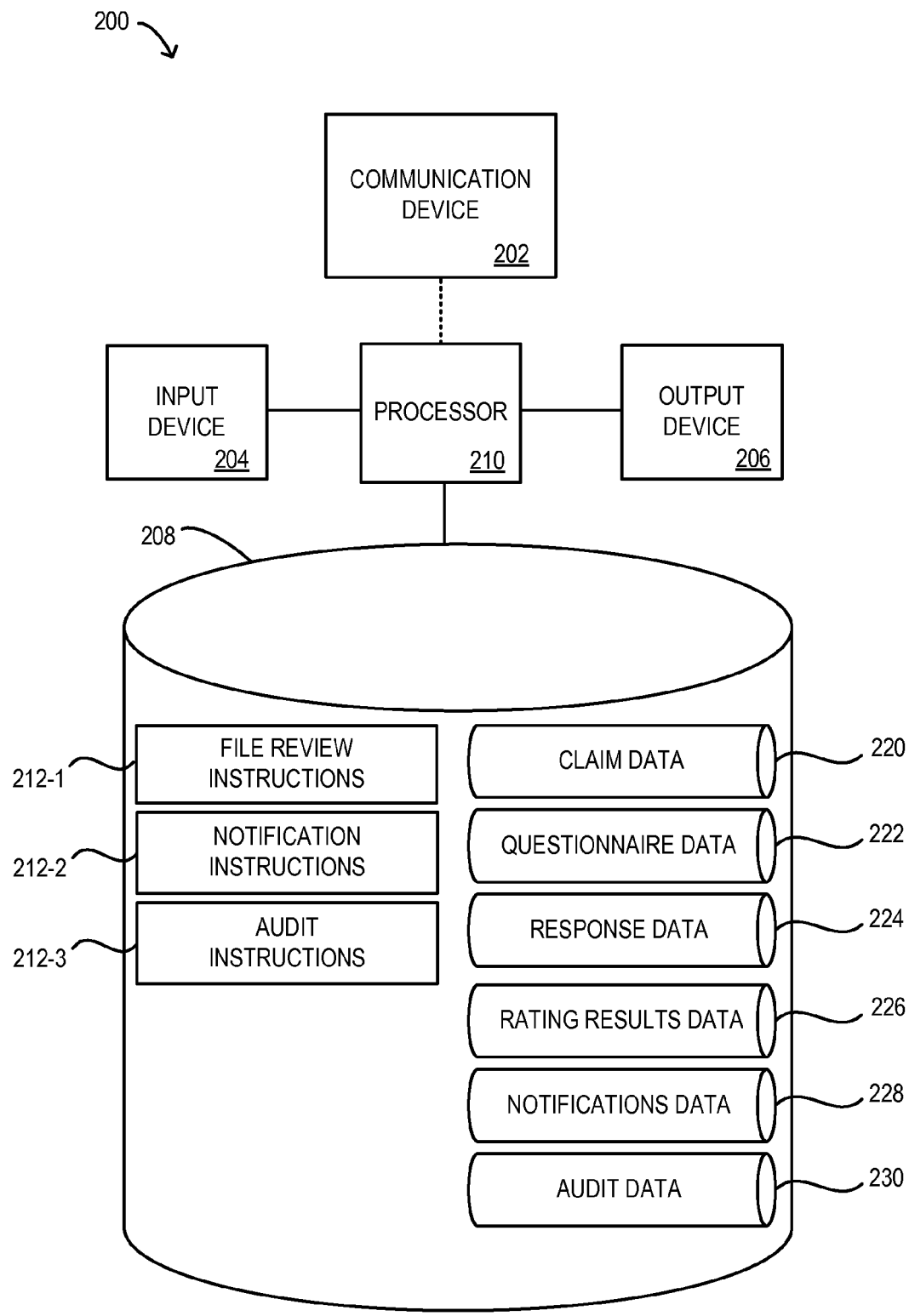
FIG. 2 is a diagram of a computer system according to some embodiments of the present invention.

Turning to FIG. 2, a block diagram of an apparatus 200 according to some embodiments is shown. In some embodiments, the apparatus 200 may be similar in configuration and/or functionality to any of the client computers 104, server computers 102, data provider devices 106, web application server 172, file review system 170, and/or file management system 180 of FIG. 1A, FIG. 1B, and/or FIG. 1C. The apparatus 200 may, for example, execute, process, facilitate, and/or otherwise be associated with any of the processes described in this disclosure (including in the figures).

In some embodiments, the apparatus 200 may comprise an input device 204, a memory device 208, a processor 210, a communication device 202, and/or an output device 206. Fewer or more components and/or various configurations of the components 202, 204, 206, 208, 210 may be included in the apparatus 200 without deviating from the scope of embodiments described in this disclosure.

According to some embodiments, the processor 210 may be or include any type, quantity, and/or configuration of processor that is or becomes known. The processor 210 may comprise, for example, an Intel® IXP 2800 network processor or an Intel® XEON™ processor coupled with an Intel® E7501 chipset. In some embodiments, the processor 210 may comprise multiple inter-connected processors, microprocessors, and/or micro-engines. According to some embodiments, the processor 210 (and/or the apparatus 200 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 200 comprises a server such as a blade server, necessary power may be supplied via a standard AC outlet, power strip, surge protector, and/or Uninterruptible Power Supply (UPS) device.

In some embodiments, the input device 204 and/or the output device 206 are communicatively coupled to the processor 210 (e.g., via wired and/or wireless connections and/or pathways) and they may generally comprise any types or configurations of input and output components and/or devices that are or become known, respectively.

The input device 204 may comprise, for example, a keyboard that allows an operator of the apparatus 200 to interface with the apparatus 200. In one example, a file review creator, data entry professional and/or supervisor may interface with the apparatus to develop, conduct, complete and/or review a review of a business file (e.g., an insurance claim file for an insurance carrier). In some embodiments, the input device 204 may comprise a sensor configured to provide information such as encoded claim, claimant or other file information to the apparatus 200 and/or the processor 210.

The output device 206 may, according to some embodiments, comprise a display screen and/or other practicable output component and/or device. The output device 206 may, for example, indicate, display or otherwise provide various types of information, including information associated with a file review (e.g., claim information, questionnaire information, response information, audit information, rating results information), to a user of the apparatus (e.g., via a computer workstation). According to some embodiments, the input device 204 and/or the output device 206 may comprise and/or be embodied in a single device such as a touch-screen monitor.

In some embodiments, the communication device 202 may comprise any type or configuration of communication device that is or becomes known or practicable. The communication device 202 may, for example, comprise a network interface controller (NIC), a telephonic device, a cellular network device, a router, a hub, a modem and/or a communications port or cable. In some embodiments, the communication device 202 may be coupled to provide data to a telecommunications device. The communication device 202 may, for example, comprise a cellular telephone network transmission device that sends signals (e.g., claim information, file review parameters, questionnaire response information) to a server in communication with a plurality of handheld, mobile and/or telephone devices. According to some embodiments, the communication device 202 may also or alternatively be coupled to the processor 210. In some embodiments, the communication device 202 may comprise an IR, RF, Bluetooth™, and/or Wi-Fi® network device coupled to facilitate communications between the processor 210 and another device (such as one or more client computers, server computers, central controllers and/or data provider devices).

The memory device 208 may comprise any number of appropriate information storage devices that are or become known or available, including, but not limited to, units and/or combinations of magnetic storage devices (e.g., a hard disk drive), optical storage devices, and/or semiconductor memory devices such as Random Access Memory (RAM) devices, Read Only Memory (ROM) devices, Single Data Rate Random Access Memory (SDR-RAM), Double Data Rate Random Access Memory (DDR-RAM), and/or Programmable Read Only Memory (PROM). Accordingly, although depicted as included in a single storage device in FIG. 2, it will be readily understood that memory device 208 may comprise one or more storage devices, and one or more such storage devices may be integrated within a single apparatus and/or distributed across one or more computing devices (e.g., accessible to apparatus 200 via a network).

The memory device 208 may, according to some embodiments, store one or more of file review instructions 212-1, notification instructions 212-2, audit instructions 212-3, claim data 220, questionnaire data 222, response data 224, rating results data 226, notifications data 228, and/or audit data 230. In some embodiments, the file review instructions 212-1, notification instructions 212-2, and/or audit instructions 212-3 may be utilized by the processor 210 to provide output information via the output device 206 and/or the communication device 202.

According to some embodiments, as described in this disclosure, file review instructions 212-1 may be operable to cause the processor 210 to determine and/or process information related to a review of a business file (e.g., review of a workers' compensation insurance claim file). Claim data 220, questionnaire data 222, and/or response data 224 may be received, for example, via the input device 204 and/or the communication device 202 and may be analyzed or otherwise processed by the processor 210 in accordance with one or more of the instructions of file review instructions 212-1. The file review instructions 212-1 may, in some embodiments, utilize information associated with a claim file and information about one or more available questionnaires to facilitate the manual selection of one or more questionnaires (e.g. by presenting questionnaire options to a user) and/or the automatic selection (e.g., by the processor 210) of one or more questionnaires for use in reviewing that claim file.

According to some embodiments, the file review instructions 212-1, when processed by the processor 210, may produce one or more interfaces (e.g., via a display device of a client computer 104) allowing a user to conduct, review, revise, and/or complete a file review. In one example, the file review instructions 212-1 may present a first set of or more questions (e.g., questions that are common or "core" with respect to one or more phases of a business workflow) and may optionally present a second set of one or more questions (e.g., questions that may be relevant to that business file, but not necessarily to all business files). In one example, a business file may involve one or more predefined special and/or complex issues, such as concerns of fraud in investigating an insurance claim, and a set of questions may be directed to the particular special concerns associated with the file. Other non-limiting examples of core issues and special issues or complexities that may be associated with one or more files are described in this disclosure.

In some embodiments, file review instructions 212-1, when processed by the processor 210, may provide for receiving or otherwise determining response information (e.g., answers to questions presented to a user) corresponding to a file review, and may provide for storing some or all of such response information in response data 224. In some embodiments, response data 224 may be accessed by the processor 210 (in accordance with file review instructions 212-1) to transmit or present response information associated with one or more files as part of a file review process. For example, in accordance with the file review instructions 212-1, response information provided previously by a claim professional (e.g., in filling out a file review questionnaire) may be retrieved (e.g., from response data 224) and presented (e.g., via an interface) to the claim professional, the claim professional's supervisor, and/or to another claim professional, for viewing and/or editing the previously submitted response information.

In some embodiments, file review instructions 212-1, when processed by the processor 210, may provide for creating, editing, and/or establishing one or more criteria, parameters, questions, and/or questionnaires for use in a file review. Such information may be stored, for example, in questionnaire data 222.

In some embodiments, users may input (e.g., via a client computer 104) one or more categories and/or questions associated with a file and/or one or more phases of a business workflow. In some embodiments, a user may establish a plurality of phases (e.g., for an insurance claim process) for a business workflow, may establish at least one set of questions for one or more of the defined phases, and/or may establish a respective weight for each question, phase, and/or file review criterion.

Returning to FIG. 2, according to some embodiments, the file review instructions 212-1 may be operable to cause the processor 210 to determine and/or process information corresponding to a file review, including one or more of claim data 220, questionnaire information 222, and/or response information 224. Response data 224 may be received, for example, via the input device 204 and/or the communication device 202 and may be analyzed or otherwise processed by the processor 210 in accordance with one or more of the instructions of file review instructions 212-1.

The file review instructions 212-1 may, in some embodiments, utilize questionnaire information (including, without limitation, any predefined workflow phases or categories, questions, and/or file review criteria) in order to rate the handling of a file with respect to, for example, one or more workflow phases, file review criteria, claim professionals, and/or business units.

In some embodiments, file review instructions 212-1 may be utilized by the processor 210 to determine a response summary, or a summation of the responses (e.g., number of instances where file review criteria were met vs. number of instances they were not met). In some embodiments, file review instructions 212-1 may be utilized by the processor 210 to determine an outcome summary, or a calculation of a respective score or other measure with respect to one or more file review criteria. Information related to a response summary and/or to an outcome summary may be stored in one or more of response data 224 and/or rating results data 226.

In one or more embodiments, file review instructions 212-1 may comprise a rating engine for determining an outcome summary based on one or more responses, questions, file review criteria, and/or workflow phases. In one example, file review instructions 212-1 may be configured to direct the processor 210 to calculate a score for how well the handling of the file met one or more quality goals (e.g., client engagement, technical skill, file information accuracy, file strategy), such as expressing the number of instances the file reviewer indicated the quality goal was met as a percentage of the total potential number of instances the goal could have been met. In one example, a file review criterion percentage is equal to a total number of credits earned for satisfaction of the file review criterion divided by the maximum number of potential credits that could have been earned for satisfaction of that file review criterion.

In some embodiments, file review instructions 212-1 may be utilized by the processor 210 to receive an indication that a notification or alert should be associated with a particular file. In one example, a file reviewer may trigger a notification when a financial or other significant event is noted on the file. For instance, in response to an insurance claim handler identifying a significant event on an insurance claim file, an indication may be stored in notifications data 228 that a notification (e.g., an email, a desktop notification or pop-up alert) is to be sent (e.g., periodically, at some predetermined time) to one or more professionals (e.g., the claim handler and the claim handler's supervisor) indicating that the significant event requires attention to be resolved for the file.

In some embodiments, notification instructions 212-2 may be utilized by the processor 210 to determine when a notification or alert should be transmitted to one or more system users. For example, the processor 210 may periodically review notifications data 228 (e.g., in a batch process) and initiate or trigger notifications. Continuing with the above example, a notification identified in notifications data 228 may be sent to one or more users associated with the notification (e.g., as stored in a record of notifications data 228) to let the users know that the significant event requires attention to be resolved for the particular file.

In some embodiments, audit instructions 212-3 may be utilized by the processor 210 to verify that a particular user is authorized to conduct, review, and/or edit a file review for one or more files, and may store a record of any users initiating, completing, editing, and/or viewing a file review. Any of such information may be stored, for example, in audit data 230. In some embodiments, audit data 230 may be utilized for determining and/or establishing compliance with one or more company, state and/or federal regulations for reporting, such as The Sarbanes-Oxley Act of 2002 governing financial reporting.

The apparatus 200 may function, in some embodiments, as a computer terminal and/or server of an insurance carrier that is utilized to process insurance claims and/or review handling of insurance claim files.

In some embodiments, the apparatus 200 may comprise a web server and/or other portal (e.g., an interactive voice response unit (IVRU)) that provides claim data 220, questionnaire data 222, response data 224, rating results data 226, notifications data 228, and/or audit data 230 to users, consumers and/or corporations.

Any or all of the exemplary instructions and data types described in this disclosure and other practicable types of data may be stored in any number, type, and/or configuration of memory devices that is or becomes known. The memory device 208 may, for example, comprise one or more data tables or files, databases, table spaces, registers, and/or other storage structures. In some embodiments, multiple databases and/or storage structures (and/or multiple memory devices 208) may be utilized to store information associated with the apparatus 200. According to some embodiments, the memory device 208 may be incorporated into and/or otherwise coupled to the apparatus 200 (e.g., as shown) or may simply be accessible to the apparatus 200 (e.g., externally located and/or situated).

Figure 3:
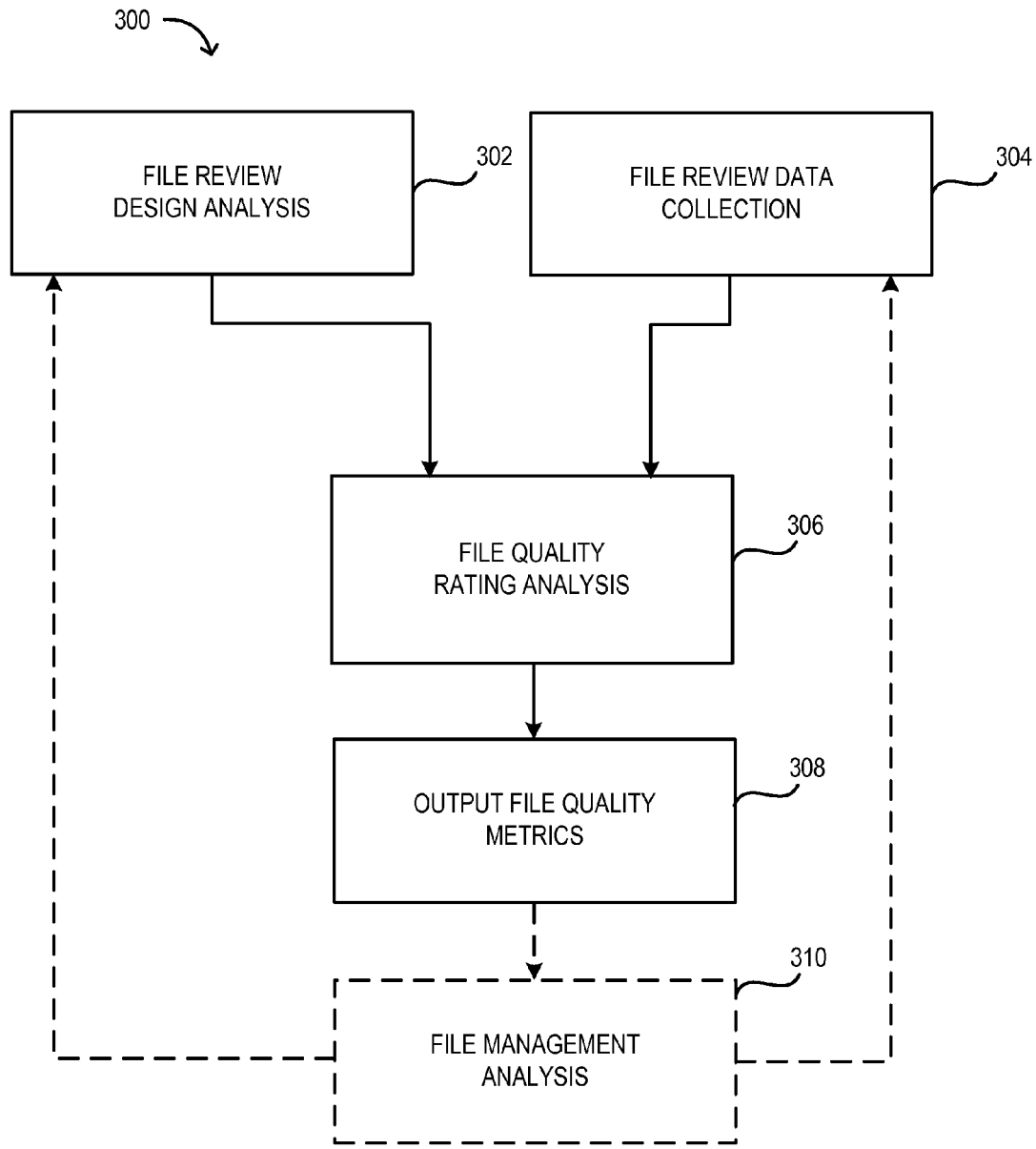
FIG. 3 is a flowchart of a method according to some embodiments of the present invention.

Referring now to FIG. 3, a flow diagram of a method 300 according to some embodiments is shown. The method 300 may, for example, be performed by or on behalf of a business (e.g., an insurance carrier). For purposes of brevity, the method 300 will be described in this disclosure as being performed by a computer on behalf of a company (e.g., a specially programmed computer and/or server computer). It should be noted that although some of the steps of method 300 may be described in this disclosure as being performed by a client computer while other steps are described in this disclosure as being performed by another computing device, any and all of the steps may be performed by a single computing device which may be a client computer, server computer, data provider device or another computing device. Further, any steps described in this disclosure as being performed by a particular computing device may be performed by a human or another computing device, as appropriate.

According to some embodiments, the method 300 may comprise file review design analysis, at 302. Such analysis, in accordance with some embodiments, may comprise one or more of: determining one or more types of business files; determining one or more file processing workflows; determining one or more activities of a workflow; determining one or more file review criteria, parameters, and/or conditions of measuring or otherwise assessing a quality of a file; determining one or more maximum potential total credits, ratings, scores, or other quality metrics that may be awarded for a given file, file professional, workflow, activity category, topic, question, and/or file review criteria; and/or determining a distribution of potential total credits, scores, or other value (e.g., a numerical value) corresponding to file quality, among one or more files, file professionals, workflows, activity categories, topics, questions, and/or file review criteria. In one embodiment, file review design analysis results in a determination of at least one file review question, a distribution of potential total credits for each question, a distribution of potential total credits for each of at least one question category or file activity category (e.g., workflow phases and/or question topics), and/or a distribution of potential total credits among one or more predetermined file review criteria.

According to some embodiments, the method 300 may comprise file review data collection, at 304. Such file review data collection, in accordance with some embodiments, may comprise one or more of: receiving information about at least one business file, account, or other unit of business information and/or receiving information about the processing of one or more business files through one or more business workflows. In some embodiments, file review data collection may comprise one or more of: accessing one or more databases to retrieve stored business file information, and/or receiving business file information from one or more computing devices. In one example, information about an insurance account, insurance claim, or other type of business account may be input by a file handling professional via a user interface of a client computer, which may transmit some or all of the information input for storage and/or processing by another computing device (e.g., a web application server).

According to some embodiments, the method 300 may comprise file quality rating analysis, at 306. File quality rating analysis, in accordance with some embodiments, may comprise determining a measure of a quality of a file and/or the handling of a file (e.g., by a company, by one or more users). In some embodiments, the file quality rating analysis is based on information resulting from the file review design analysis (302) and/or file review data collection (304). In some embodiments, the collected file review data for one or more files is compared to one or more of the maximum potential scores of file quality to assess a score for the at least one file relative to the maximum potential score. In some embodiments, file quality rating analysis results in one or more file quality ratings, scores, or other metrics, such as a percentage reflecting the quality of a file (e.g., with respect to one or more file review criteria) relative to the maximum potential quality score based on the associated file review design. One or more such file quality metrics may be stored in accordance with instructions for file quality rating analysis.

According to some embodiments, the method 300 may comprise outputting file quality metrics, at 308. Outputting file quality metrics, in accordance with some embodiments, may comprise one or more of: storing at least one file quality metric (e.g., in a local and/or remote database); accessing, retrieving, receiving, or otherwise determining at least one file quality metric (e.g., based on the file quality rating analysis); and/or displaying, presenting, or otherwise transmitting an indication of a quality of a business file (e.g., a file quality percentage) to one or more users (e.g., professionals within a business organization) and/or other computing devices (e.g., for storage, for presentation to a user).

According to some embodiments, the method 300 may comprise file management analysis, at 310. Such file management analysis, in some embodiments, may comprise one or more of: reviewing the file quality metrics (308), revising file review design analysis (e.g., to re-distribute potential credits or other measures of file quality among one or more the various parameters of file review design described above); revising a process for file review data collection (e.g., to improve the type and/or accuracy of information collected); and/or changing information associated with one or more files (e.g., to re-submit a file to one or more aspects of a file handling workflow, to re-assign a file from one professional to another).

Figure 4:
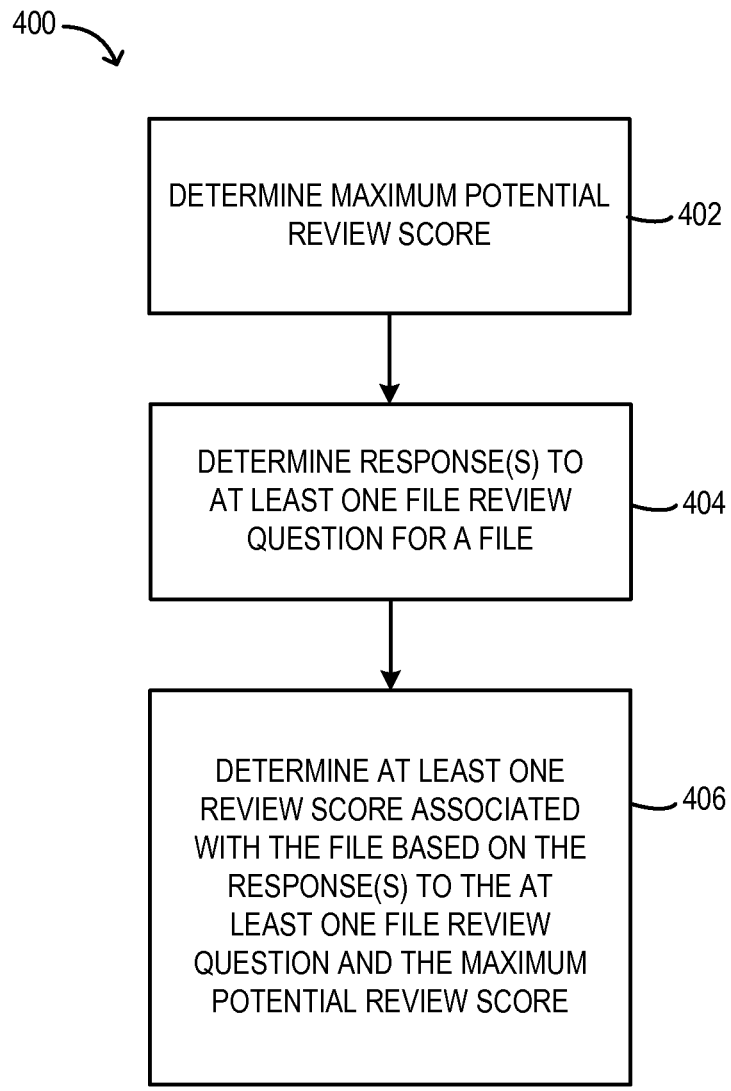
FIG. 4 is a flowchart of a method according to some embodiments of the present invention.

Referring now to FIG. 4, a flow diagram of a method 400 for conducting a file review according to some embodiments is shown. The method 400 may, for example, be performed by or on behalf of a business (e.g., an insurance carrier). For purposes of brevity, the method 400 will be described in this disclosure as being performed by a computer (e.g., apparatus 200, a specially programmed computer and/or server computer) on behalf of a company. It should be noted that although some of the steps of method 400 may be described in this disclosure as being performed by a client computer while other steps are described in this disclosure as being performed by another computing device, any and all of the steps may be performed by a single computing device which may be a client computer, server computer, data provider device or another computing device. Further, any steps described in this disclosure as being performed by a particular computing device may be performed by a human or another computing device, as appropriate.

According to some embodiments, the method 400 may comprise determining a maximum potential review score, at 402. In some embodiments, determining a maximum potential review score comprises determining a maximum potential review score associated with at least one file review question, associated with at least one topic, associated with at least one phase, and/or associated with at least one file. In some embodiments, determining a maximum potential review score may comprise determining a maximum number of credits (or other measure of numerical value) to assign to a file review question (e.g., by associating the number of credits with the question in a database), to a topic, to a workflow phase, and/or to a file. In one example, each question (and/or potential response to the question) may be associated with a predetermined number of credits. In some embodiments, questions are designed with various response options, e.g., "YES/NO," "TRUE/FALSE," "RED/WHITE/BLUE," and each available response option may be associated with a predetermined number of credits (e.g., zero credits for "NO" and 7 credits for "YES"). As discussed in this disclosure, in some embodiments, if a response to a question indicates the handling of the file meets a file review criterion (e.g., successful performance of a predetermined file handling activity), the associated predetermined number of credits is determined (e.g., from a database of questionnaire information) and may be added to a total of credits earned in a file review (e.g., for a plurality of questions). In some embodiments, if a response indicates the handling of the file does not meet an associated file review criterion, a corresponding associated predetermined number of credits may be determined (e.g., it may be zero credits, a negative number of credits, or some other number of credits) and added to a total of credits earned in a file review. Alternatively, any response indicating a failure to meet file review criteria may be automatically associated with a predetermined number of credits (e.g., zero credits) without necessarily determining a number of credits associated with the specific question and/or without adding the credits to a running total.

In some embodiments, a first question is associated with a first number of credits, and a second question is associated with a second number of credits, where the first number of credits may be different than the second number of credits. In some embodiments, a first response to a question (e.g., "YES, CRITERIA X WAS MET"; "THE CUSTOMER WAS SOMEWHAT SATISFIED") is associated with a first number of credits, and a second response to the question is associated with a second number of credits (e.g., "NO, CRITERIA Y WAS NOT MET"; "THE CUSTOMER WAS DISSATISFIED WITH THE RESULT"), where the first number of credits may be different than the second number of credits. Accordingly, different questions and/or different response may be associated with different measures of quality, reflecting the relative importance of different questions and/or responses to assessing file management quality.

According to some embodiments, the method 400 may comprise determining at least one response to at least one file review question for a file, at 404. In some embodiments, determining at least one response to at least one file review question for a file may comprise one or more of: accessing and/or receiving claim information (e.g., claim data 200); accessing and/or receiving questionnaire information (e.g., questionnaire data 222); accessing, receiving, and/or storing response information (e.g., storing user responses in association with respective corresponding questions in response data 224); accessing and/or receiving an indication of one or more file handling complexities; accessing and/or receiving input from one or more users (e.g., via a user interface of a client computer); and/or presenting one or more user interfaces (e.g., for receiving responses to file review questions).

In one example, a question related to a particular activity in the processing of a file or account is presented to a professional responsible for handling the file or account via a user interface, and the professional inputs a response to the question ("YES," "NO," "NOT APPLICABLE") via the user interface. The response may be stored and/or transmitted to one or more other computing devices and/or users. In another example, a user is provided with a questionnaire about several different phases of a file handling workflow process, each phase having its own associated set of one or more questions, and the user provides responses to one or more of the presented questions of the questionnaire.

According to some embodiments, the method 400 may comprise determining at least one review score associated with the file based on (1) the at least one response determined response and (2) the determined maximum potential review score, at 406. In some embodiments, determining at least one review score may comprise one or more of: calculating, generating, or looking up (e.g., a database) a review score; determining a review score associated with a file review question; determining a review score corresponding to a plurality of file review questions; determining a review score corresponding to a phase or activity category (e.g., of a file handling workflow); determining a review score corresponding to at least one file review criteria (e.g., determining the handling of a file with respect to at least predetermined parameter for measuring file quality); determining a review score for a file (e.g., an overall file quality review score); comparing a review score (e.g., a total number of credits) corresponding to responses provided to a file review questionnaire (e.g., from step 404) with a maximum potential review score (e.g., stored in questionnaire data 222) that could be earned based on the particular file review questionnaire (e.g., from step 402). In some embodiments, determining at least one review score comprises deriving a second review score based on a first review score and a maximum potential review score. For example, a first review score for responses to one or more review questions may be compared to a maximum potential review score for those review questions (e.g., if all corresponding file review criteria had been met) to derive a second review score that is a ratio of the first review score to the maximum potential review score. In another example, the first review score may be expressed as a percentage of the maximum potential review score.

According to some embodiments, determining the maximum potential review score (402) and/or determining at least one review score (406) may comprise adjusting at least one maximum potential review score. In one embodiment, a second maximum potential review score may be determined based on a first maximum potential review score and information about a file. In one example, a maximum potential review score may be determined based on a determination that one or more file review questions are not applicable or appropriate for reviewing one or more particular files. Accordingly, the total maximum potential value assigned to a workflow, workflow phase, phase topic (e.g., a core or special file handling issue), and/or file review criteria may need to be modified and/or distributed among one or more other questions, phases, topics, and/or file review criteria.

According to some embodiments, determining at least one review score may comprise determining whether a given file review question and/or a response for a given file review question, is not applicable to the file review analysis. If a question is applicable (e.g., if a user provides a substantive "YES" or "NO" response to whether a file handling task was performed and/or one or more file review criteria were met), a corresponding review score may be determined for the question, as discussed in this disclosure with respect to various embodiments.

If, in accordance with some embodiments, the question is determined (e.g., by a user, by a computing device, and/or in accordance with file review instructions 212-1) to be not applicable, determining a file review score may comprise revising the determined maximum potential review score (e.g., predetermined number of credits) corresponding to at least one file review question and/or determining a new maximum potential review score corresponding to at least one file review question. In some embodiments, revising or determining a new maximum potential review score may comprise distributing or re-distributing a predetermined potential review score assigned to one or more questions, to one or more activity categories or phases, to one or more files, and/or to one or more file review criteria. Some ways of determining review scores in instances where questions are deemed not applicable are discussed in this disclosure.

According to some embodiments, determining and/or adjusting a maximum potential review score may comprise determining a maximum potential review score for one or more file handlers. For example, in order to determine a measure of file handling quality with respect to a first file handler, where more than one file handler was responsible for handling the file, the questions directed to activities that were not handled by the first file handler may be removed from the analysis. Accordingly, the specific distributed maximum potential review scores for questions not dealt with by the first handler may be redistributed among the other questions within the same topic and/or activity phase (e.g., on a pro rata basis with respect to the total potential maximum score for that topic or phase).

According to some embodiments, the method 400 may comprise outputting and/or storing an indication of the at least one determined review score associated with the file, such as by displaying the at least one determined review score (e.g., via a display screen of a client computer) and/or transmitting an indication of the at least one review score (e.g., for storage in rating results data 226).

Figure 5:
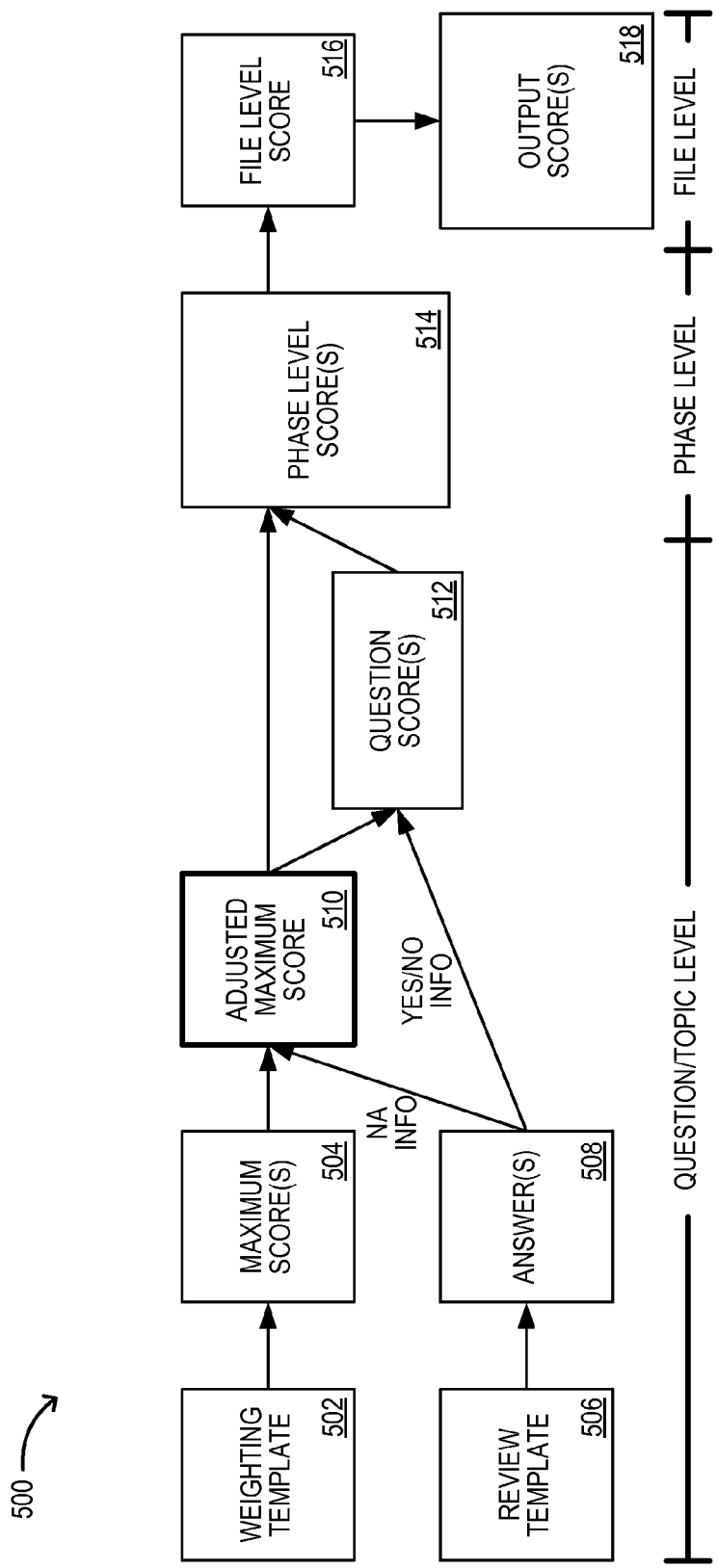
FIG. 5 is a flowchart of a method according to some embodiments of the present invention.

Referring now to FIG. 5, a flow diagram of a method 500 for conducting a file review according to some embodiments is shown. The method 500 may, for example, be performed by or on behalf of a business (e.g., an insurance carrier). For purposes of brevity, the method 500 will be described in this disclosure as being performed by a computer (e.g., apparatus 200, a specially programmed computer and/or server computer) on behalf of a company. It should be noted that although some of the steps of method 500 may be described in this disclosure as being performed by a client computer while other steps are described in this disclosure as being performed by another computing device, any and all of the steps may be performed by a single computing device which may be a client computer, server computer, data provider device or another computing device. Further, any steps described in this disclosure as being performed by a particular computing device may be performed by a human or another computing device, as appropriate.

According to some embodiments, the method 500 may comprise determining and/or providing a weighting template, at 502. In some embodiments, determining and/or providing the weighting template may comprise presenting a template interface to one or more users (e.g., file handling experts) for designing and/or inputting one or more file activities, phases, topics, questions, and/or file review criteria, with associated numerical values (e.g., potential review scores). For example, determining a weighting template for a file review may comprise determining a plurality of questions around a particular activity in a file handling process (e.g., resolving an insurance claim), determining one or more quality parameters or file review criteria to assess the quality of the file handling, and distributing credits to each of the questions, sets of questions, and/or file review criteria. In some embodiments determining and/or providing the weighting template may comprise accessing a database corresponding to a file review design (e.g., questionnaire data 222).

According to some embodiments, the method 500 may comprise determining at least one maximum score, at 504. In some embodiments, determining a maximum score comprises identifying a particular predetermined maximum potential number of credits that may be associated with a particular question, question topic, question phase, file, file handler, and/or file review criterion, and consequently may be earned, for example, upon an indication that an associated file handling activity has been successfully completed and/or a file review criterion has been satisfied.

According to some embodiments, the method 500 may comprise determining and/or providing a review template, at 506. In some embodiments, determining the review template may comprise determining at least one file review question for presenting to a user and/or presenting the at least one file review question to the user.

According to some embodiments, the method 500 may comprise determining at least one answer to at least one file review question (e.g., "YES," "NO," "NA" ("NOT APPLICABLE")), at 508. In some embodiments, determining the at least one answer comprises determining more than one answer to one file review question. In one example, a file review question may be presented and the file reviewer is required to provide separate answers to the question with respect to whether each of two or more file review criteria were met. In some embodiments, each of one or more file review questions may be associated with one or more answers.

According to some embodiments, the method 500 may comprise adjusting the maximum score (e.g., based on an answers of "NOT APPLICABLE"), at 510. The method 500 further may comprise determining question scores, at 512, for one or more file review questions based on the answers (from 508) and the maximum score (which may be adjusted at 510). In one example, a default maximum score of 0.25 credits for a particular question is adjusted to 0.37 credits because one or more other questions within the same question topic or phase are deemed to be not applicable, and the default scores for the non-applicable questions are distributed, on a pro rata basis, to the applicable questions within the topic or phase. In some embodiments, the corresponding maximum score for a question for which one or more file review criteria were met is counted toward the review score for that question. In one example, a "#" operation is performed on a matrix of answers to questions and a matrix of corresponding maximum scores for those questions to derive the actual score for each question based on the file review. Some examples of the # operation are provided in this disclosure.

According to some embodiments, the method 500 may comprise determining a phase level review score for a workflow phase level, at 514. In some embodiments, determining a phase level review score may comprise combining the respective scores for all the questions within the phase and/or combining the respective scores for a plurality of topics (e.g., subsets of questions) within a given phase. In some embodiments, determining a phase level review score may comprise determining a maximum potential score for a phase (and/or one or more topics or subsets of questions within the phase) and comparing the actual score for the phase (e.g., based on the answers to the questions) with the maximum potential phase score (e.g., by deriving a percentage or other ratio). In some embodiments, determining a phase level review score may therefore include determining the phase level review score based on the adjusted maximum potential review score information determined at 510.

According to some embodiments, the method 500 may comprise determining a file level review score for a given file, at 516. In some embodiments, determining a file level review score may comprise combining the respective scores for all the questions within the file review, combining the respective scores for all the topics within the file review, and/or combining the respective scores for all the phases within the file review. In some embodiments, determining a file level review score may comprise determining a maximum potential score for a file (e.g., 1.0 credits) and comparing the actual score for the file (e.g., 0.875) with the maximum potential file score (e.g., by deriving a percentage or other ratio).

According to some embodiments, the method 500 may comprise outputting one or more of the maximum scores, scores for questions and/or topics, phase level scores, and/or file level scores, at 518. Outputting may comprise displaying an indication of one or more scores via a user interface, client computer, display screen or other output device, and/or transmitting an indication of one or more scores for storage in a database (e.g., in rating results data 226).

The development of a file review process and/or the relative weighting of various file review criteria across one or more variables, including workflow phases, question topics, and/or questions, may be based, in accordance with some embodiments, on an analytic hierarchy process (AHP), a decision making procedure originally developed by T. L. Saaty for solving decision and estimation problems in multivariate environments. AHP allows users to establish priority weights for evaluating alternatives by organizing a hierarchy of objectives, criteria, sub-criteria, etc. Information about the analytic hierarchy process that may be useful in using AHP to, for example, establish file review criteria, workflow phases, question topics, and/or questions, may be found in Saaty, T. L., "Axiomatic foundation of the analytic hierarchy process," Management Sci., 32(7), 841-855 (1986) which is incorporated by reference in this disclosure.

Numerous references may be made for convenience in this disclosure to an example implementation of a file review for managing insurance claim files (e.g., associated with a claim of a claimant under an insurance policy). According to the example implementation, the insurance claim handling process includes five workflow "phases," including engagement, investigation, coverage, evaluation, and resolution. Each example phase includes a set or "topic" of activities or issues that are considered common or "core" to the phase. Each phase may also encompass one or more topics that are special or related to complex activities or issues, called "complexities," that may not be present in all files. The example insurance claim file review process referred to in this disclosure also uses four file review criteria, which may be referred to as "foundations" of file quality, to evaluate the handling of a claim: customer engagement, technical skill, information accuracy, and file strategy. It will be readily understood that one or more embodiments described in this disclosure may be applicable to other types of businesses and/or other types of files, accounts, and the like. Accordingly, the use of examples of reviewing files in the insurance industry or with respect to the handling of insurance claims is not intended to the limit the scope of the embodiment, unless explicitly stated otherwise.

A file review process for handling insurance claim files based on AHP may begin, in accordance with some embodiments, with identifying two or more file review criteria for measuring file quality, and determining how much the claim activities associated with each file review question contribute to the claim quality measured by the file review criteria of interest. Under AHP, the assumption is that not all file handling activities are equally important.

Figure 6:
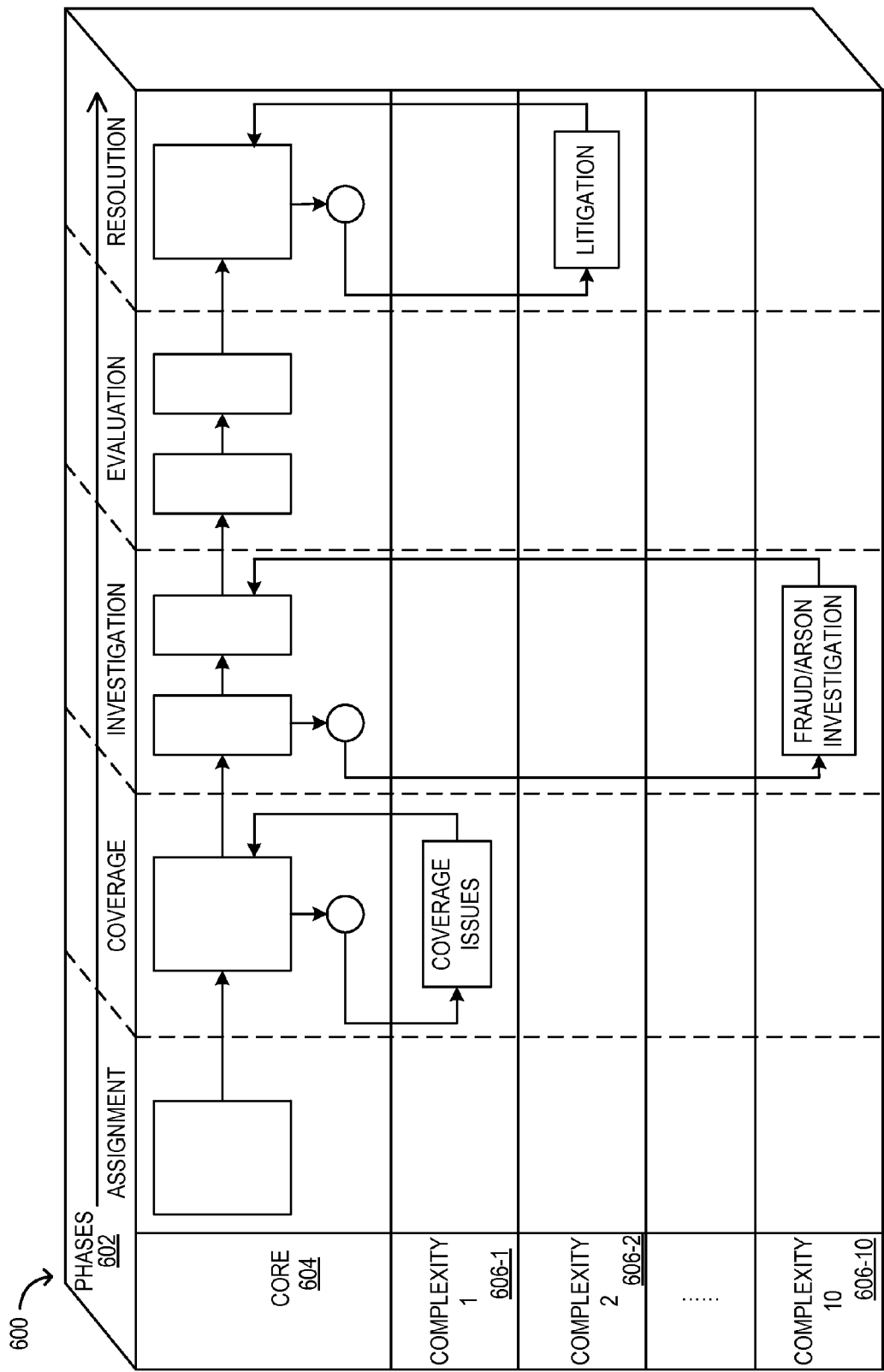
FIG. 6 is a file review design model according to some embodiments of the present invention.

Turning to FIG. 6, a file review design model 600 is provided for an example insurance claim handling process with example phases 602 of the claim handling process, including example assignment, coverage, investigation, evaluation, and resolution phases. The file review design model 600 also includes a representation of the respective core questions 604 that would be asked of a file reviewer for each phase 602. The file review design model 600 also includes representations of potential complexity issues 606-1, 606-2 . . . 606-10 that may arise for particular phases 604. In the example model depicted, coverage issues has been identified (as COMPLEXITY 1 606-1) as a potentially complicated issue that may arise during the coverage phase of handling a claim. Similarly, litigation (COMPLEXITY 2 606-2) and fraud/arson investigation (COMPLEXITY 10 606-10) are identified as complex issues in the resolution and investigation phases, respectively. As discussed above, the identified complexities may be useful in designing corresponding questions that may be presented, for example, during a review of a file in which such issues were present.

In some embodiments, a user may establish one or more file review criteria for use in reviewing the file and/or completing a file review or questionnaire process. In some embodiments, a particular question may be associated with one or more of a plurality of such criteria. In some embodiments, a user may be prompted (e.g., via a user interface) to answer a particular question separately with respect to each of one or more file review criteria, such as, without limitation, overall business strategy for the file, allocation of personnel having the appropriate technical skills, accuracy of file data, and/or engagement with the client or customer.

In some embodiments, any one or more criteria, parameters, questions, and/or questionnaires may be associated (e.g., in questionnaire data 222) with a respective weight, credit, or other score that may be useful, in accordance with some embodiments, for analyzing and/or rating the handling of a file.

Figure 7:
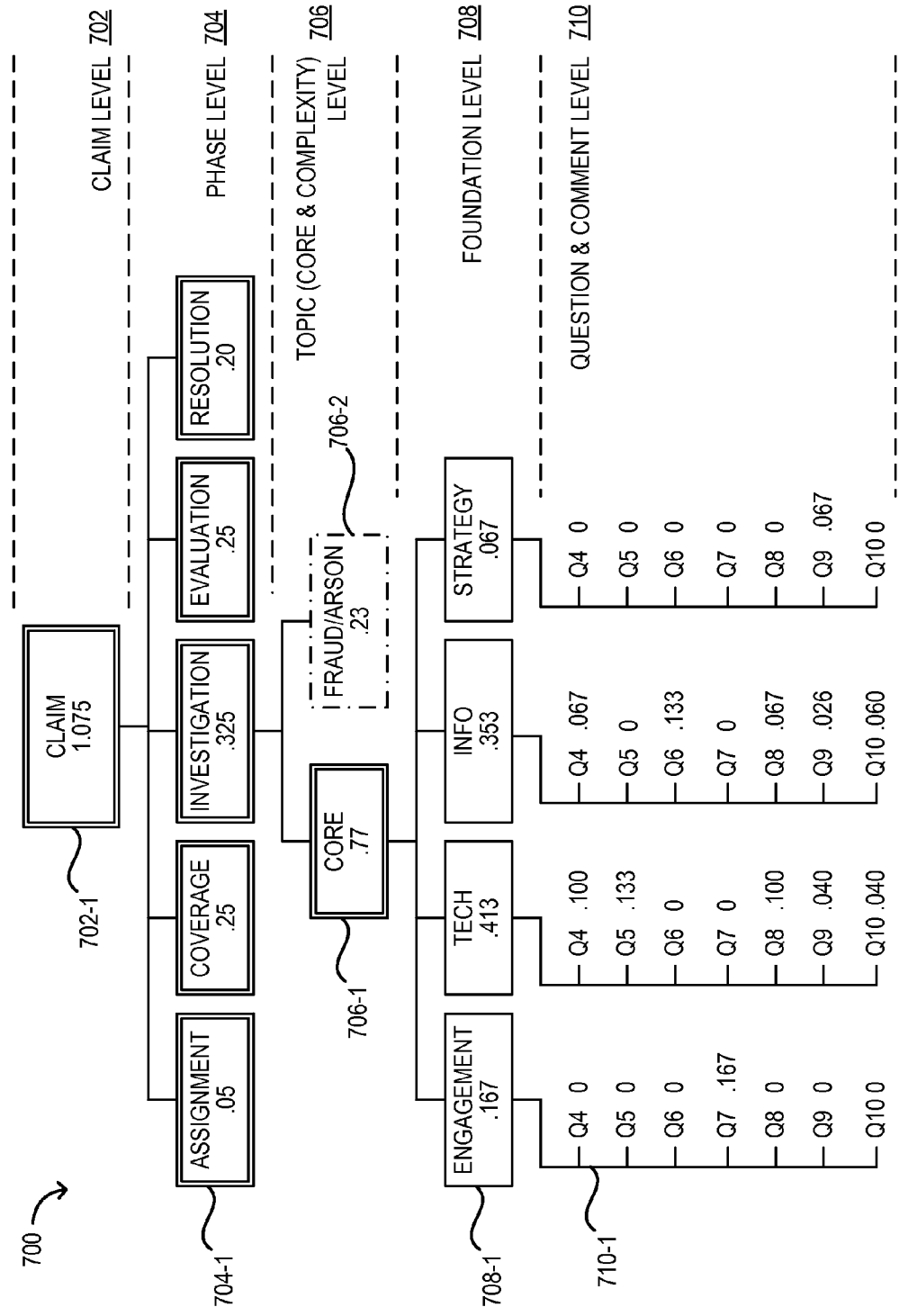
FIG. 7 is a file review design model according to some embodiments of the present invention.

FIG. 7 depicts an example file review design model 700 for an example insurance claim handling process. A claim level 702 is depicted with a file or claim credit 702-1 of 1.075 credits overall for any given claim file. Claim credit 702-1 represents, in this example, a maximum potential amount of credit that could be afforded the claim file during a file review, if all applicable file review criteria are satisfied. In some embodiments, claim credit 702-1 may be represented as 1.0

(e.g., where no complex issues are involved), or as any other weighting as deemed desirable for a particular implementation.

Phase level 704 is depicted with several example workflow activity categories or phases that may be involved in handling an insurance claim, each phase having a corresponding phase credit 704-1. The illustrated example phases include assignment of the claim file, policy coverage, investigation of the claim, evaluation of the claim, and resolution of the claim. It will be noted that the example phase credits 704-1 represent an allocation of the entirety of the claim credit 702-1 among the phases: 1.075 total credits=0.05+0.25+0.325+0.25+0.2. In an embodiment without any complexities, as discussed above, the allocated phase weightings may add up to 1.0. In some embodiments, the respective weightings for a given model level may be represented as percentages (e.g., of the next level up in the model hierarchy).

Topic level 706 represents one or more sub-phases, categories, and/or question sets that may be associated with one or more individual phases, and indicates the corresponding respective weightings (e.g., within a phase). In the depicted example, a core set of questions are given a core topic weight 706-1 of 0.77, and an optional fraud/arson complexity topic is given a complexity topic weight 706-2 of 0.23, and may be correspondingly understood as being respective percentage weights of the total potential phase credit allocated to the example investigation phase. Accordingly, 77% of the total 0.325 potential review credit for the investigation phase (or 0.25025) may be earned through meeting all of the criteria for the core topic questions, and 23% of the total 0.325 potential review credit (or 0.07475) may be earned through meeting all of the criteria for the example fraud/arson complexity topic questions.

Foundation level 708 represents an example weighted allocation of the total credits 706-1 (0.77) that may be earned under the core topic questions for the example investigation phase. The example "foundations" represent file qualities, or file review criteria, that may be associated with one or more questions associated with various claim activities, and that may be measured for their contribution to the quality of the claim file and/or handling of the claim file. The example file review criteria include customer engagement, technical skill, information accuracy, and overall file strategy. The total core credits 706-1 are distributed among these four file review criteria in the example as foundation weights 708-1.

Question & comment level 710 represents question set 710-1, comprising questions labeled Q4 through Q10, and indicates, for each question, the weighting that has been assigned to that question to reflect its contribution to one or more of the file review qualities. For example, only question Q7 is associated as potentially contributing to the customer engagement foundation; accordingly, all of the potential 0.167 credits for that foundation is assigned to Q7. In another example, the potential 0.413 credits available for the technical skill foundation within the core topic of the investigation phase is distributed (unequally, in the example) among questions in the set: 0.413 credits=0.1+0.133+0.1+0.04+0.04. Accordingly, questions Q4, Q5, Q8, Q9, and Q10 may ask a file reviewer whether the respective file handling activity that is the subject of the respective question is believed to have contributed toward satisfaction of the technical skill quality goal (or not), and questions Q6 and Q7 may not ask if the activity contributed toward that particular quality goal.

The file review design model 700 thus may be useful in designing a questionnaire for a file review in which questions are weighted differently with respect to their relative contributions to file quality across one or more measurements of such quality. In some embodiments, a representation of a file review design model 700 may be presented via a computer interface (e.g., based on file review instructions 212-1 and/or instructions of a file review or questionnaire design application), allowing a user to design a questionnaire, define one or more levels in a review hierarchy, one or more activity categories or phases, one or more topics or sub-phases, one or more file review criteria or qualities, and/or one or more questions. In some embodiments, the user may be allowed to input and/or edit respective credits or other weightings assigned to one or more hierarchy levels, criteria, phases, topics, file review criteria, and/or questions. In some embodiments, selecting a particular level and/or object within a level (e.g., a particular representation of a phase, topic, or file review criteria), such as by using a pointer device or other input device, may result in displaying additional or detail information about that object. For instance, the model 700 depicts example detail information for the investigation phase. In one embodiment a user may be able to click on another phase (e.g., coverage) using a questionnaire design application and the application in response displays the corresponding topic, foundation, and question level information for the selected phase.

According to some embodiments, pairings of questions with associated file review criteria may be presented to a user in one or more of a variety of manners, including as a single question having separate sub-questions, input fields and/or other interface elements so that the user may answer the question with respect to each criterion. According to some embodiments, multiple related variations of the same question directed specifically to each criterion may be presented to the user (e.g., "At initial assignment, was the file assigned in a timely manner that meets the quality goal of providing the level of technical skill appropriate for the file?"). Other ways of presenting questions for file reviews with respect to one or more associated file review criteria will be readily apparent to those of skill in the art upon contemplation of this disclosure.

For instance, an example question, "At initial assignment, was the file assigned in a timely manner?", may be presented via an interface in a manner prompting a user to answer the question separately with respect to whether the file assignment met multiple file review criteria, such as (1) whether or not the timeliness of the file assignment satisfactorily met the business's criterion for serving the overall business strategy for the file, and (2) whether the timeliness of the file assignment satisfactorily met the business's criterion for demonstrating allocation of personnel having the appropriate technical skills to the file.

In some embodiments determining the relative importance of questions to each file review criterion (e.g., each foundation) may comprise determining which questions for a given phase apply to which foundation and/or determining what percent of the credit for a question should be assigned for each applicable foundation. The number of foundation credits per question may be determined, in some embodiments, by multiplying the number of question credits by the percentage of the credit that should be assigned to that foundation. In some embodiments, the number of potential credits available for a given foundation for a given phase may be determined by summing up the total number of the question credits allocated to that foundation within the phase. In some embodiments, if all of the question credits are allocated, the total number of foundation credits for a phase should be equal to the total number of question credits available for that phase.

Turning to FIG. 8, a questionnaire design model 800 is provided for reviewing example insurance claim files. Although depicted with respect to an investigation phase of an insurance claim file workflow, those of skill in the art upon contemplating this disclosure will understand that such a model may be modified as desirable for use with other types of files, phases, and/or questions. Questionnaire design model 800 may be useful, in some embodiments, for assessing how much one or more of various file handling activities contribute to the quality of a file and/or how much the measures of each of various file review criteria (e.g., foundations) contribute to the quality of a file. The example model 800 allows for discriminating among file activities within an example investigation phase (e.g., questions about "core" activities for claim investigation generally applicable to all such files), file review criteria, and/or questions by weighting their respective contributions to file quality assessment differently within the example phase. In other words, the model 800 allows advantageously for the assumption that not all types of file handling activities, even within a particular subset of file handling activities, contribute equally to overall file quality and/or to the quality of that particular workflow phase or sub-phase, and allows for such activities to be ranked or weighted based on their relative importance to file quality. Although questionnaire design model 800 is directed to an investigation phase, it will be recognized that one or more alternative and/or additional phases 802 may be utilized in designing a questionnaire, as deemed appropriate for the particular type(s) of files and/or activities.

Question number 804 indicates an identifier that identifies a question. For example, the question number 804 may uniquely identify a question within a given phase and/or topic. File review question 806 indicates example questions related to the example claim investigation process. Question credits 808 includes an indication of a number of credits assigned (e.g., by a questionnaire designer or other user) to the corresponding question. Phase question credit total 814 indicates a total number of credits assigned to the representative phase. In some embodiments, the number of credits assigned to a given phase may established as 1.0, and portions of the total credit distributed (e.g., by a reviewing panel) among various activities within the phase (e.g., as represented by the file review questions 806).

As discussed in this disclosure, the satisfactory completion of a particular activity may contribute differently to some measures of file quality than to other measures. Foundation percentages 810 and foundation credits 812 are analogous representations of how the questionnaire designers of the example questions design model 800 have allocated the respective credits for each question across the example file review criteria 810-1 and 812-1: customer engagement (CE), technical skill (TS), information accuracy (IA), and file strategy (FS). For instance, the model indicates that of the total 0.167 credits that could be earned by satisfaction of question #4 for all criteria, 0.1 (or 60%) could be earned for meeting the technical skill review quality, and 0.067 (or 40%) could be earned for meeting the file strategy review quality. Phase foundation credit total 816 indicates the total potential number of credits that may be earned for satisfying the respective file criterion for all applicable questions. For instance, in the example design, meeting the technical skill criterion for all applicable questions (#4, 5, 8, 9, and 10) will earn a total of 0.413 credits toward the file's quality score. It will be readily understood that it is not necessary to store and/or derive indications of both percentages and absolute credits for distribution across the file review criteria, and that either measure may be derived if the total question credits 808 and the other measure are known.

In some embodiments, an affirmative answer to a question of a file review may be automatically allocated across any applicable file review criteria. For instance, if the answer to the example question #9 of whether appropriate resources were utilized to assist in the investigation is "YES," then the potential 0.133 question credits 808 may be earned according to the indicated distribution of 0.040 (or 30% of 0.133), 0.027 (or 20% of 0.133), and 0.067 (or 50% of 0.133). In other embodiments, a file reviewer is asked to determine whether each individual file review criterion was met by the activity described in a question. Accordingly, for instance, a questionnaire may be designed so that a file reviewer may respond to the question, "Was the cause of loss properly determined and documented to support the coverage decisions?", in the affirmative to indicate that the technical skill file review criterion was demonstrated (e.g., earning 0.1 of the total possible 0.167 for the activity), but also reply in the negative with respect to the quality of information accuracy (e.g., earning no credits for that file review criterion). Accordingly, some embodiments provide advantageously for granularity in responding to whether the same activity meets one or more criteria for file handling quality.

Turning to FIG. 9, a file review design model 900 is provided for reviewing example insurance claim files. Although depicted with respect to example phases, topics, file review criteria, and assigned numerical values (e.g., "credits"), those of skill in the art upon contemplating this disclosure will understand that such a model may be modified as desirable for use with other types of files, workflows, phases, activities, value measurements, and/or questions. File review design model 900 may be useful, in some embodiments, for assessing how much one or more of various file handling activities contribute to the quality of a file and/or how much the measures of each of various file review criteria (e.g., foundations) contribute to the quality of a file. The example model 900 allows for discriminating among different activity categories or phases in the workflow for handling a file and/or file review criteria by weighting their respective contributions to file quality assessment differently within each example phase and/or topic. In other words, the model 900 allows advantageously for the assumption that not all types of file handling activities contribute equally to overall file quality and/or to the quality of that particular workflow phase, activity, topic, or sub-phase allows for such activities to be ranked or weighted based on their relative importance to file quality. Although questionnaire design model 900 is directed to an insurance claim handling workflow, it will be recognized that one or more alternative and/or additional phases 902, topics 904, topic credit totals 908, foundation percentages 910, foundation credits 912, and/or file review criteria 910-1 and 912-1 may be utilized in designing a questionnaire, as deemed appropriate for the particular type(s) of files and/or activities.

File review design model 900 depicts several example phases or workflow categories, and several example types of topics or issue categories within the example phases. For example, in some embodiments a phase 902 may have at least one first corresponding topic 904 (e.g., for addressing predefined common or "core" issues or activity areas) associated with a first topic credits total 908 and may have at least one second corresponding topic 904 (e.g., for addressing atypical, special and/or complex issues or activity areas) associated with a second topic credits total 908.

In accordance with some embodiments, designing a file review process and/or questionnaire, and/or conducting a file review may comprise determining a maximum possible score (e.g., a potential number of credits that could be earned based on responses to a file review questionnaire) for a reviewed file.

Figure 10:
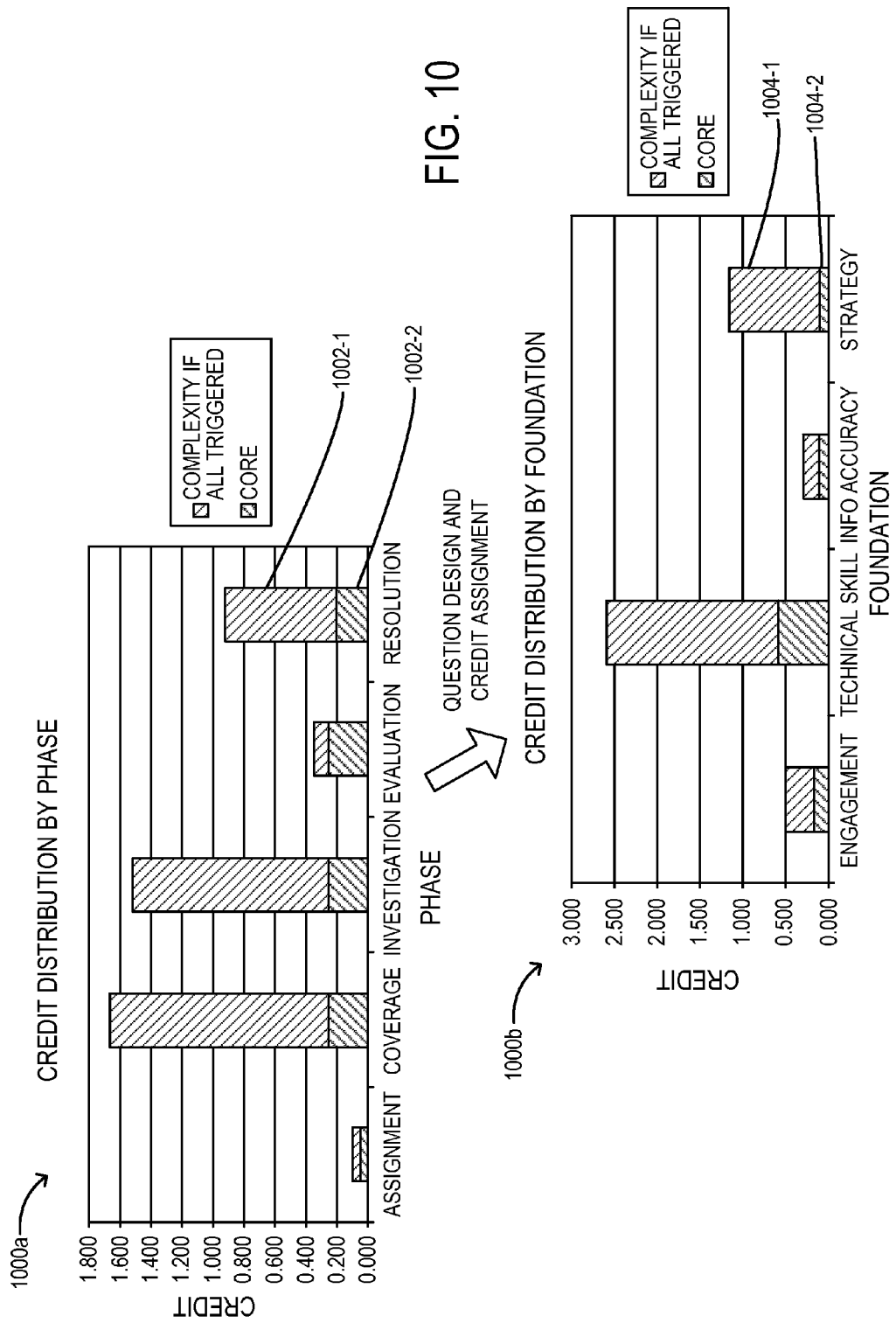
FIG. 10 depicts credit distribution models according to some embodiments of the present invention.

Turning to FIG. 10, example file review credit distribution models 1000a and 1000b are provided in the context of reviewing insurance claim files. Model 1000a depicts an example distribution of potential credits by phase for reviewing insurance claim files, including the example phases of assignment, coverage, investigation, evaluation, and resolution. As indicated, each phase has been assigned a corresponding number of potential credits, such as the example distribution 1002-2, that could be awarded for the core topics within a respective phase, reflecting the relative importance of each phase to the overall file quality. In accordance with some embodiments, the credit distribution model 1000a also represents a potential number of credits 1002-1 that could be distributed within each phase, if all of any applicable complexities are triggered for that phase. Accordingly, model 1000a indicates one example of how, for each phase defined for a file processing workflow, a total number of potential credits could be earned in a review of a file.

Model 1000b depicts a corresponding model representing the distribution (e.g., after questions are designed for each phase and/or topic and potential credits established for each question), of the total potential credits, across one or more file review criteria. In the depicted example, the file review criteria comprise predetermined quality foundations including customer engagement, technical skill, information accuracy, and file strategy. Model 1000b thus indicates, on a per file review criterion basis, how the potential credits from each phase (e.g., identified in model 1000a) could be earned with respect to the one or more file review criteria established by the file review designer(s). As in model 1000a, model 1000b distinguishes between total potential credits 1004-2 that could be earned from core questions and total potential credits 1004-1 that could be earned from questions related to complex or special topics (e.g., if any of such special topics are triggered for or otherwise relevant to a given file).

According to some embodiments, if the responses to one or more questions of a topic indicate the questions (and/or the corresponding file handling activity or file review criteria) are not applicable to a particular file, the potential score that would otherwise have been applicable to those questions may be redistributed to the remaining questions that are relevant. In some situations, the credits for a particular non-applicable question may be redistributed among the applicable questions such that the relative distribution of potential foundation credits remains the same. In some situations, the non-applicability of one or more questions may result in a file review criterion or foundation no longer being relevant to the file review (e.g., with respect to at least one topic or phase). Accordingly, the foundation credit for the non-applicable question(s) may be redistributed to any remaining foundations such that their relative weightings with respect to each other remain the same (e.g., on a pro rata basis).

Figure 11A:
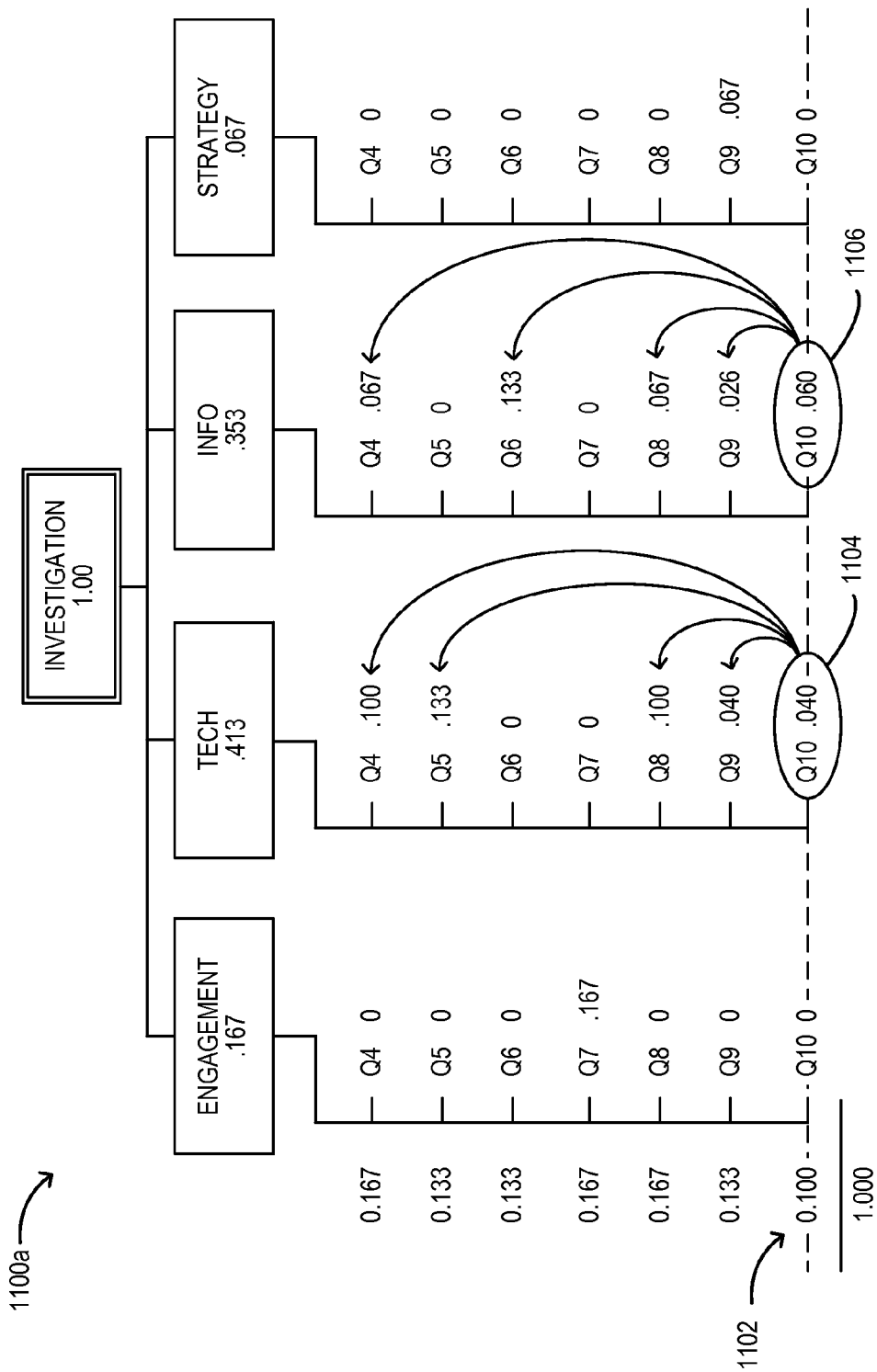
FIG. 11A depicts a credit distribution model according to some embodiments of the present invention.
Figure 11B:
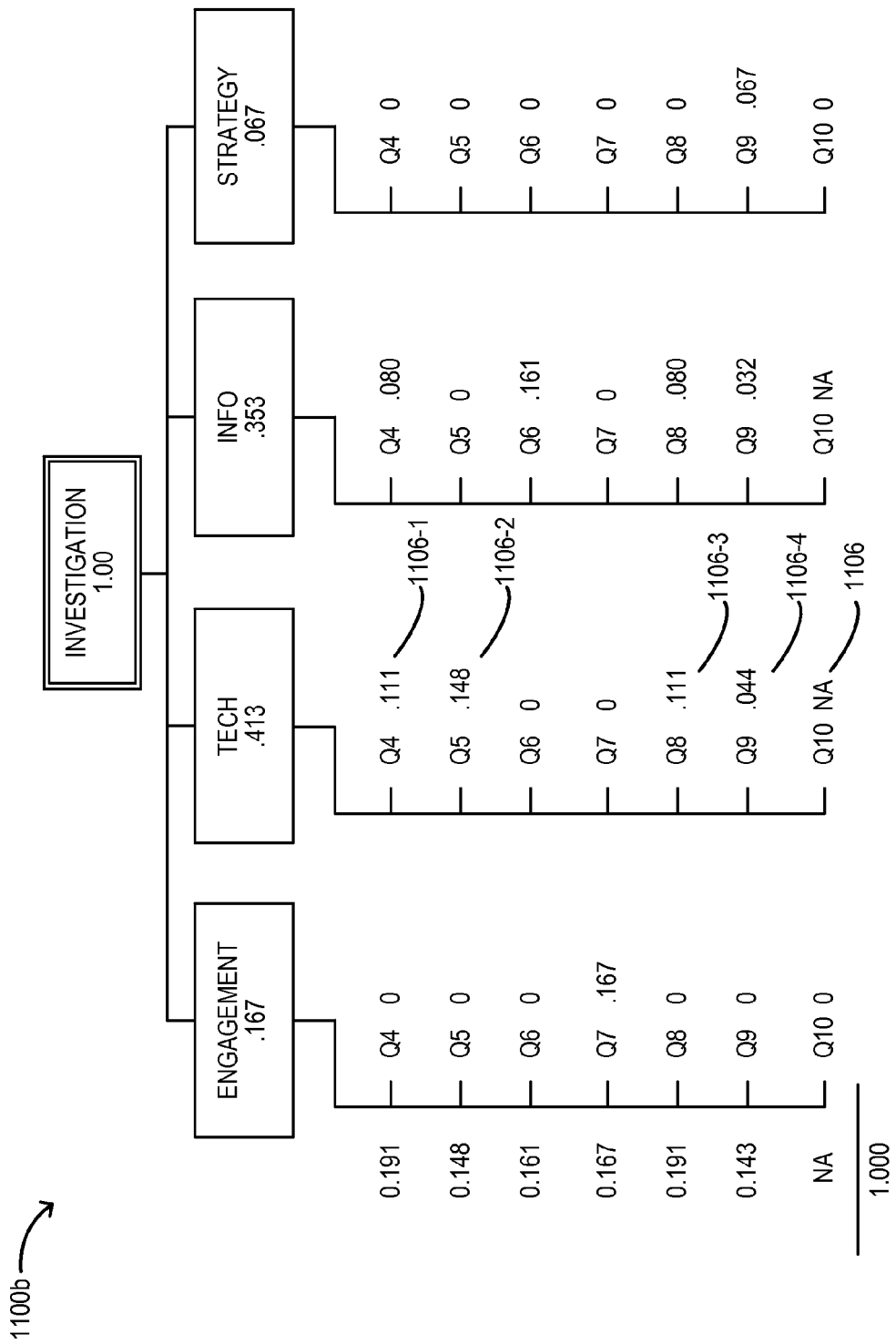
FIG. 11B depicts a credit distribution model according to some embodiments of the present invention.

Referring to FIG. 11A, an example credit distribution model 1100a depicts the distribution of credits associated with a non-applicable question 1102 ("Q10"). For example, a file reviewer may determine that Q10 is not applicable to reviewing an insurance claim file, and select "N/A" or the like from an interface dropdown menu for that question. In response, as indicated in model 1100a, the credits 1104 for Q10 (0.040) are redistributed within the "TECH" foundation among the remaining questions Q4, Q5, Q8, and Q9. Similarly, the credits 1106 for Q10 (0.060) are redistributed within the "INFO" foundation among the remaining questions Q4, Q6, Q8, and Q9. FIG. 11B depicts, in an example model 1100b, the relative allocation of the total question credits across the foundations after the adjustment for the non-applicability of Q10. For example, question credits 1106-1, 1106-2, 1106-3, and 1106-4 have been increased as the 0.040 credits from non-applicable Q10 were allocated to the remaining questions, in proportion to the relative distribution of the "TECH" foundation credits across those questions. In this way, the total number of credits for each foundation within the example phase remains the same, and accordingly the relative weighting of the foundations within the phase remains the same and the total number of question credits potentially available in the phase remains the same.

Figure 12A:
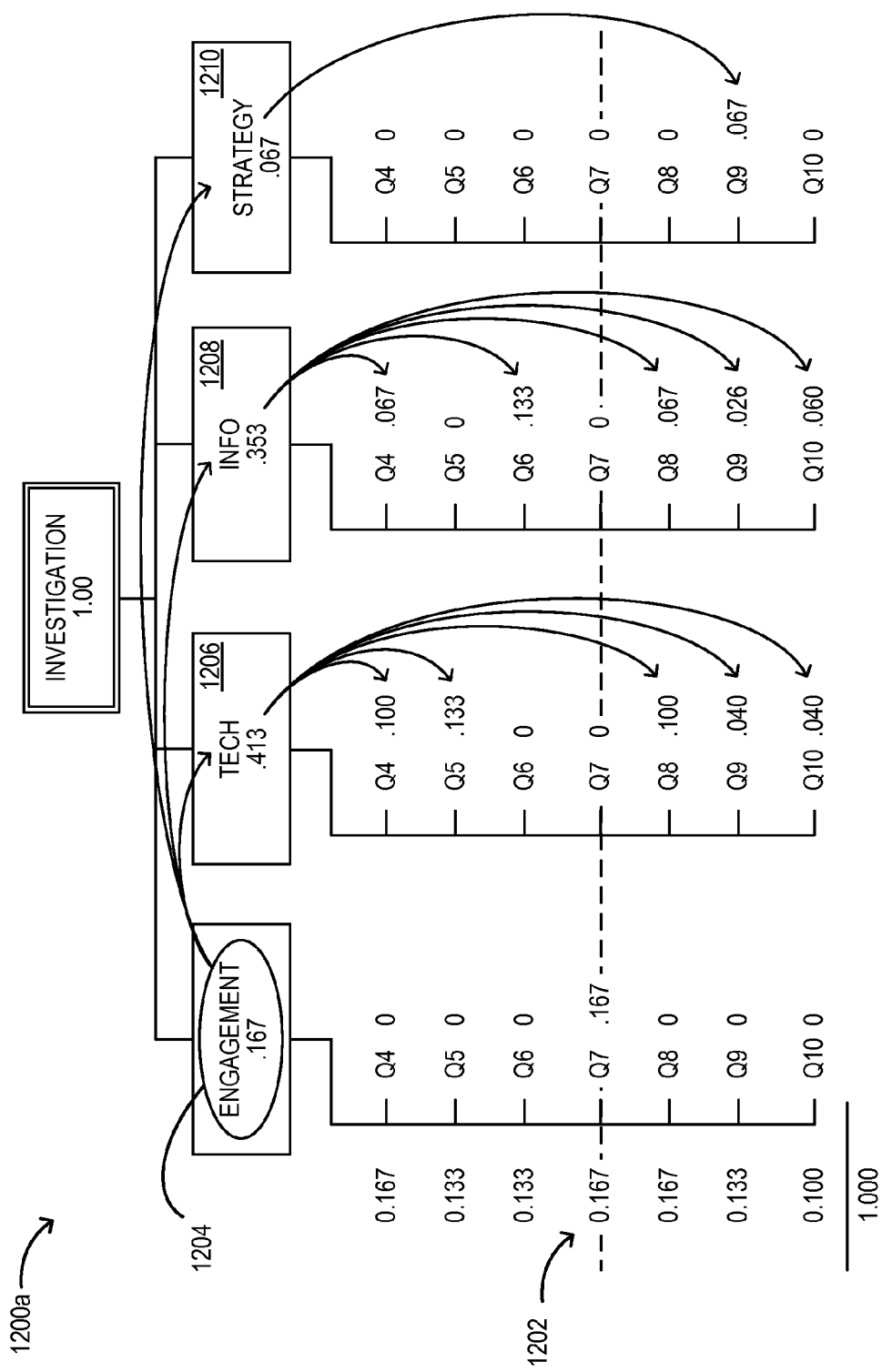
FIG. 12A depicts a credit distribution model according to some embodiments of the present invention.
Figure 12B:
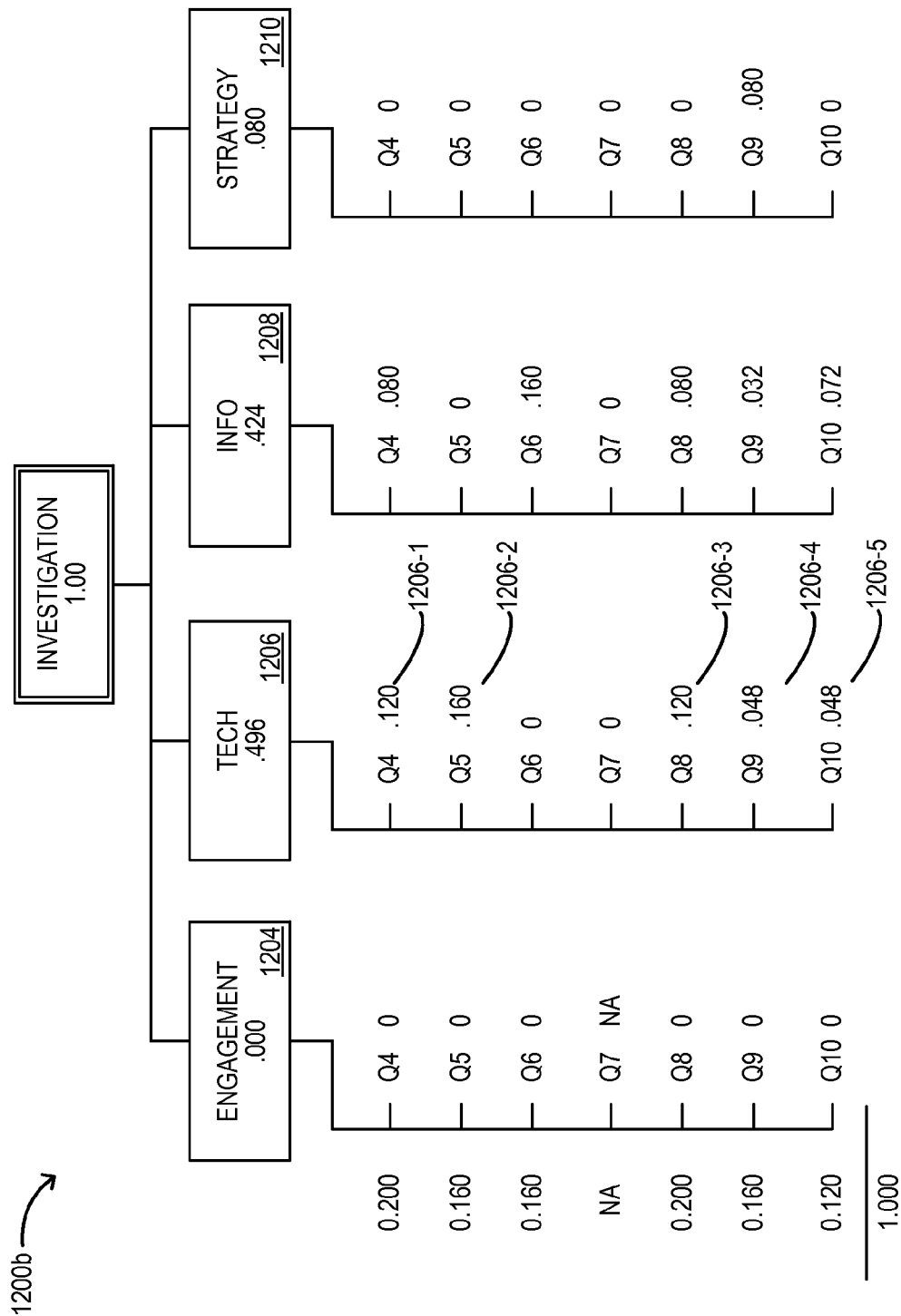
FIG. 12B depicts a credit distribution model according to some embodiments of the present invention.

Referring to FIG. 12A, an example credit distribution model 1200a depicts the distribution of credits associated with a non-applicable question 1202 ("Q7"). For example, a file reviewer may determine that Q7 is not applicable to reviewing an insurance claim file, and select "N/A" or the like from an interface dropdown menu for that question. In response, as indicated in model 1200a, any credits for Q10 (0.167) should be redistributed. However, because Q7 was the only question associated with file review criteria 1204 ("ENGAGEMENT"), the question credits, in some embodiments, may be distributed across the other foundations such that their weights relative to one another remain the same. In the example model 1200a, the 0.167 credits available for Q7 are allocated proportionally among the remaining foundations and then, within each foundation, the allocated numerical value is allocated proportionally among the applicable questions. FIG. 12B depicts, in an example model 1200b, the relative allocation of the foundation credits 1204 across the foundations after the adjustment for the non-applicability of Q7. For example, question credits 1206-1, 1206-2, 1206-3, 1206-4, and 1206-5 for foundation 1206 have been increased as that foundation's share, among the remaining foundations, of the total credits is increased to 0.496=0.413/(0.413+0.353+0.067). The increase of 0.83 credits was allocated to the questions of foundation 1206, in proportion to the relative distribution of the "TECH" foundation credits across those questions. Similarly changes are reflected in the updated question credits for the foundation 1208 and foundation 1210. It may be preferred to prevent this type of adjustment, as it results in different benchmarks for the foundations.

Figure 13A:
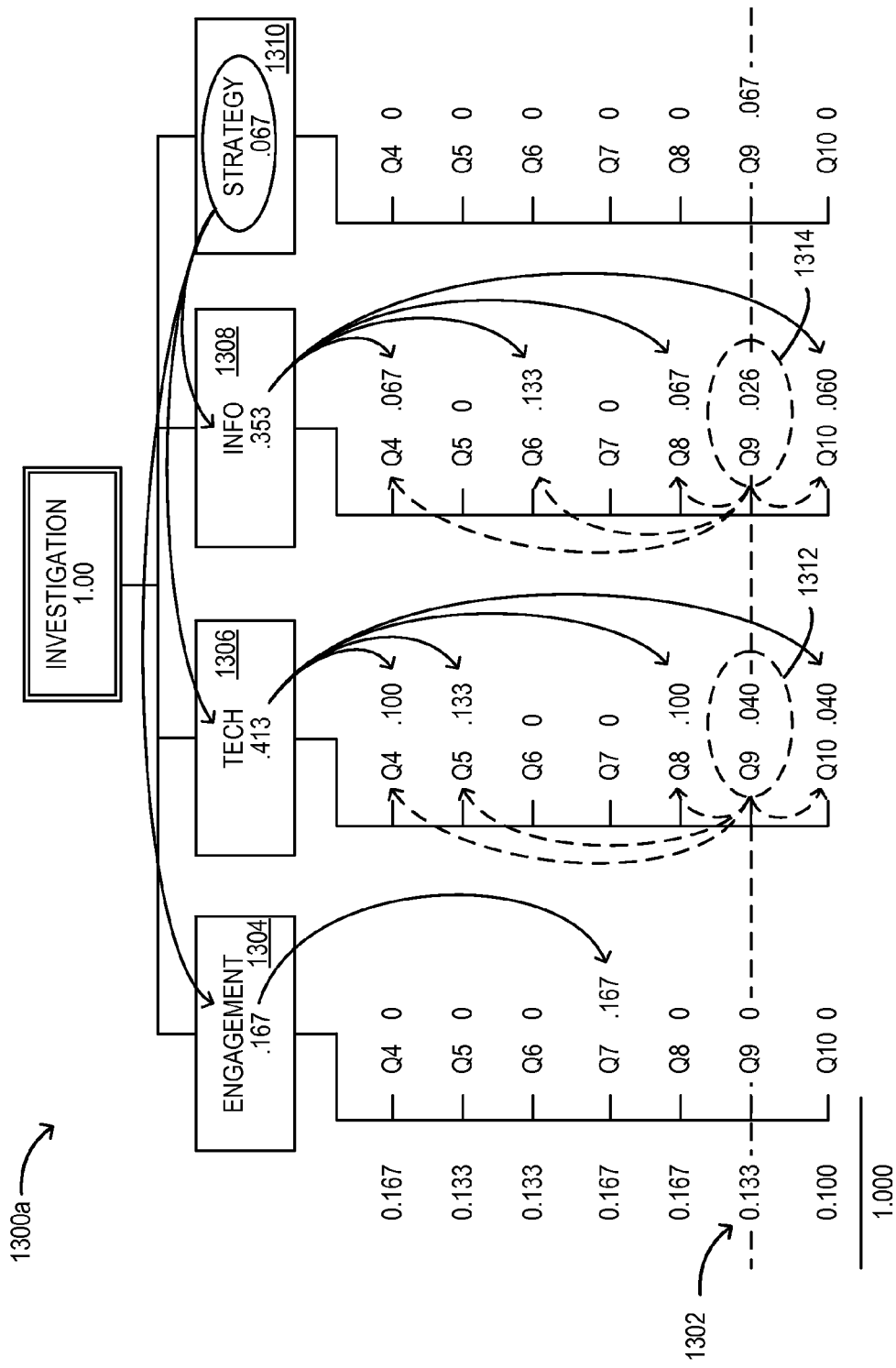
FIG. 13A depicts a credit distribution model according to some embodiments of the present invention.
Figure 13B:
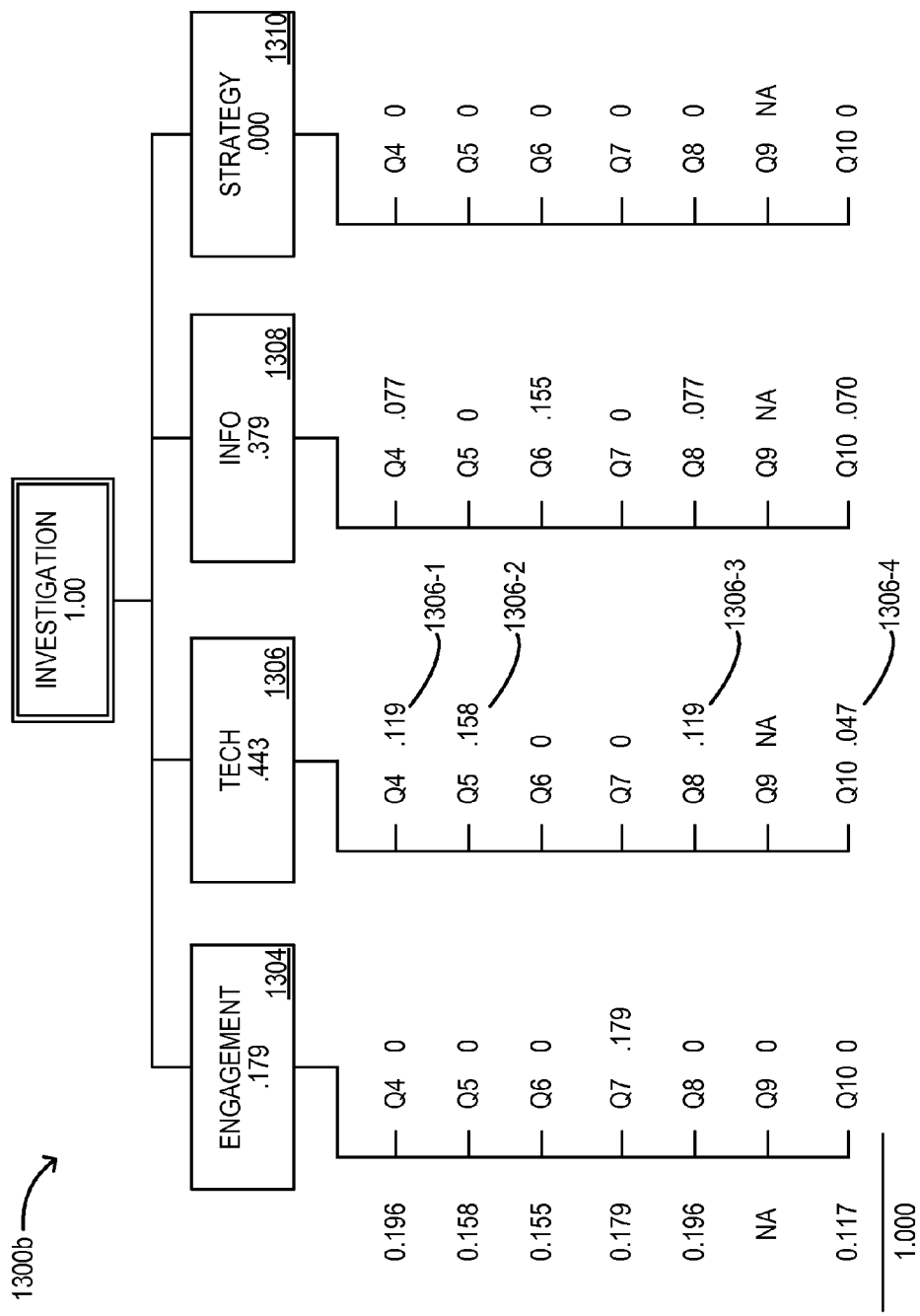
FIG. 13B depicts a credit distribution model according to some embodiments of the present invention.

Referring to FIG. 13A, an example credit distribution model 1300a depicts the distribution of credits associated with a question 1302 ("Q9") deemed not applicable to three potential foundations 1306, 1308, and 1310. The resulting distribution is a hybrid of the adjustment depicted in FIGS. 11A, 11B, 12A, and 12B, in that it requires the distribution of credits 1312 and credits 1314 for Q9 within foundations 1306 and 1308, and also requires the distribution of all of the foundation credits for foundation 1310 (because Q9 was the only potentially relevant question) across remaining foundations 1304, 1306, and 1308. FIG. 13B depicts, in an example model 1300b, the relative allocation of credits within and to foundation 1306 based on the non-applicability of Q9. For example, question credits 1306-1, 1306-2, 1306-3, and 1306-4 for foundation 1306 have been increased as that foundation's share of the total credits is increased to 0.443. The increase of credits for the foundation 1306 was allocated to the questions of foundation 1306, in proportion to the relative distribution of the "TECH" foundation credits across those questions, and the credits for Q9 within foundation 1306 were also distributed across the remaining questions in that foundation. Similarly changes are reflected in the updated question credits for the foundations 1304, 1308 and 1310. It may be preferred to prevent this type of adjustment, as it results in different benchmarks for the foundations.

It may be desirable in some embodiments to keep the same relative distribution of credits across file review criteria. For example, file review criteria distribution is a reflection of file characteristics. Also, it may be advantageous to treat files as homogeneous at a lower level in the analytical hierarchy (e.g., the topic level), and analyze variety (e.g., peer groups) at a file level, based on other parameters (e.g., complexity issues).

Figure 14:
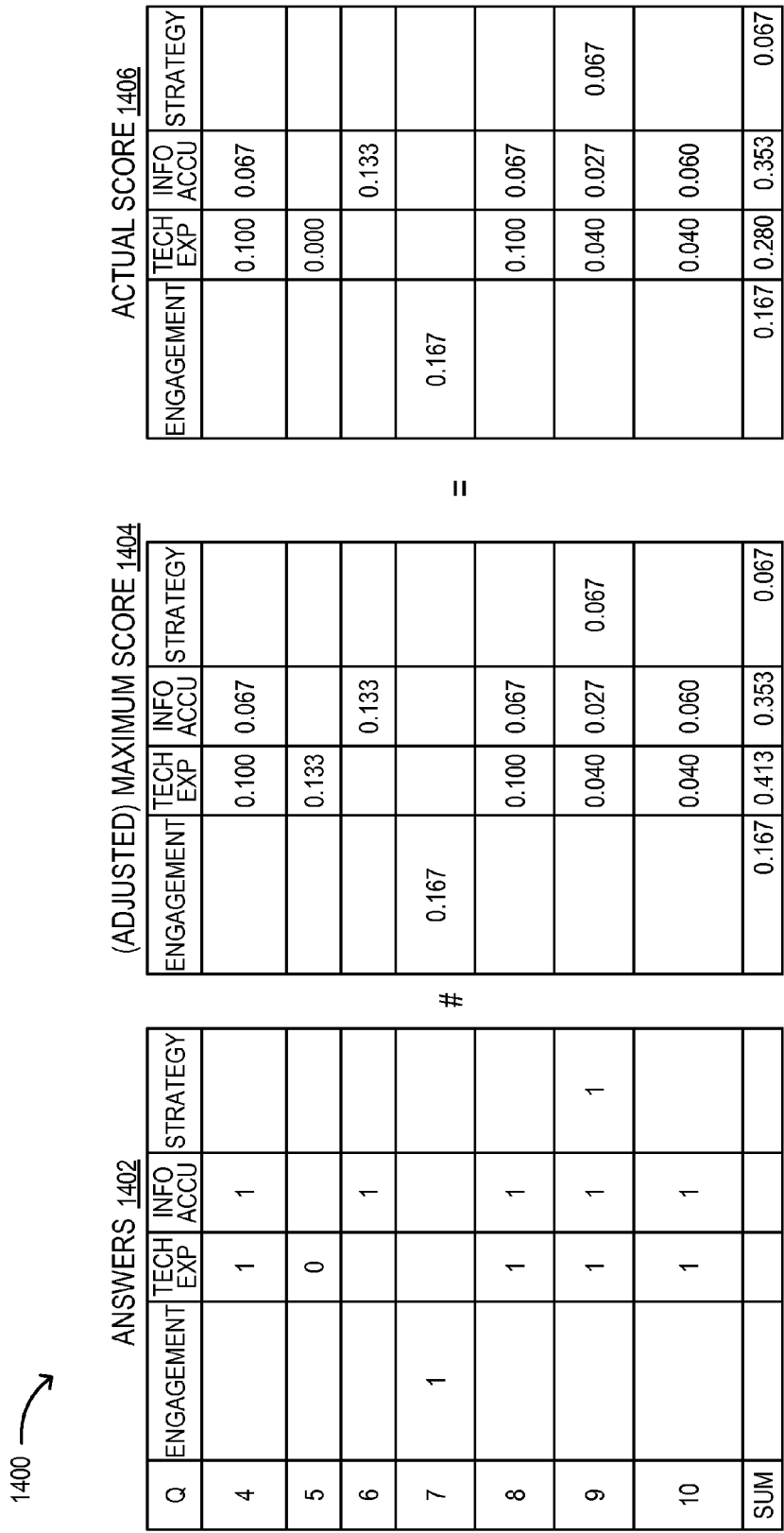
FIG. 14 depicts a review scoring model according to some embodiments of the present invention.

Referring to FIG. 14, a review scoring model 1400 depicts a "#" operation on an answers data 1402 table and a maximum score data 1404 table of elements to yield actual score data 1406, for an example set of questions. As discussed in this disclosure, the maximum scores may comprise one or more scores adjusted from a default maximum score to account, for example, for the non-applicability of one or more questions and/or foundations for a given file review. The model 1400 depicts answers data 1402 as indicating answers in the form of numerical values (e.g., "1" or "0," which in the example correspond to "TRUE" or "FALSE," respectively), and corresponding adjusted maximum score values for the pairings of questions and example foundations. The "#" operation provides for element by element multiplication to yield an actual question score for each indicated foundation. For instance, the response "1" to question #4 with respect to the technical skill foundation is multiplied by the maximum potential review score "0.100" for that question and foundation pairing, to give the question review score of "0.100" for that question with respect to that foundation.

FIG. 15 depicts a review scoring model and provides an illustration of how phase level scores may be determined, in accordance with some embodiments, with respect to an example insurance claim file review process. The phase distribution 1501 indicates that for the example investigation phase, the total credits 1.000 are distributed among a core topic (0.770 credits) and a fraud/arson topic (0.230). It will be understood that in some embodiments, one or more topics (e.g., the fraud/arson topic) may be optional and/or only triggered by predefined inputs during a file review.

The investigation—core data table 1502 indicates an example distribution of (potential) adjusted credits across a matrix of questions and foundations, and the actual scores for each question and foundation pairing. The fraud/arson data table 1504 provides similar information with respect to questions for that topic. The investigation phase data table 1506 provides a summary of information for both topics, indicating the maximum potential score, and the actual score, for each of the four foundations. The percentage table 1508 presents the summary information for the file review for the example investigation phase, where the indicated foundation percentage=actual score for the foundation/maximum potential score for the foundation.

Figure 16:
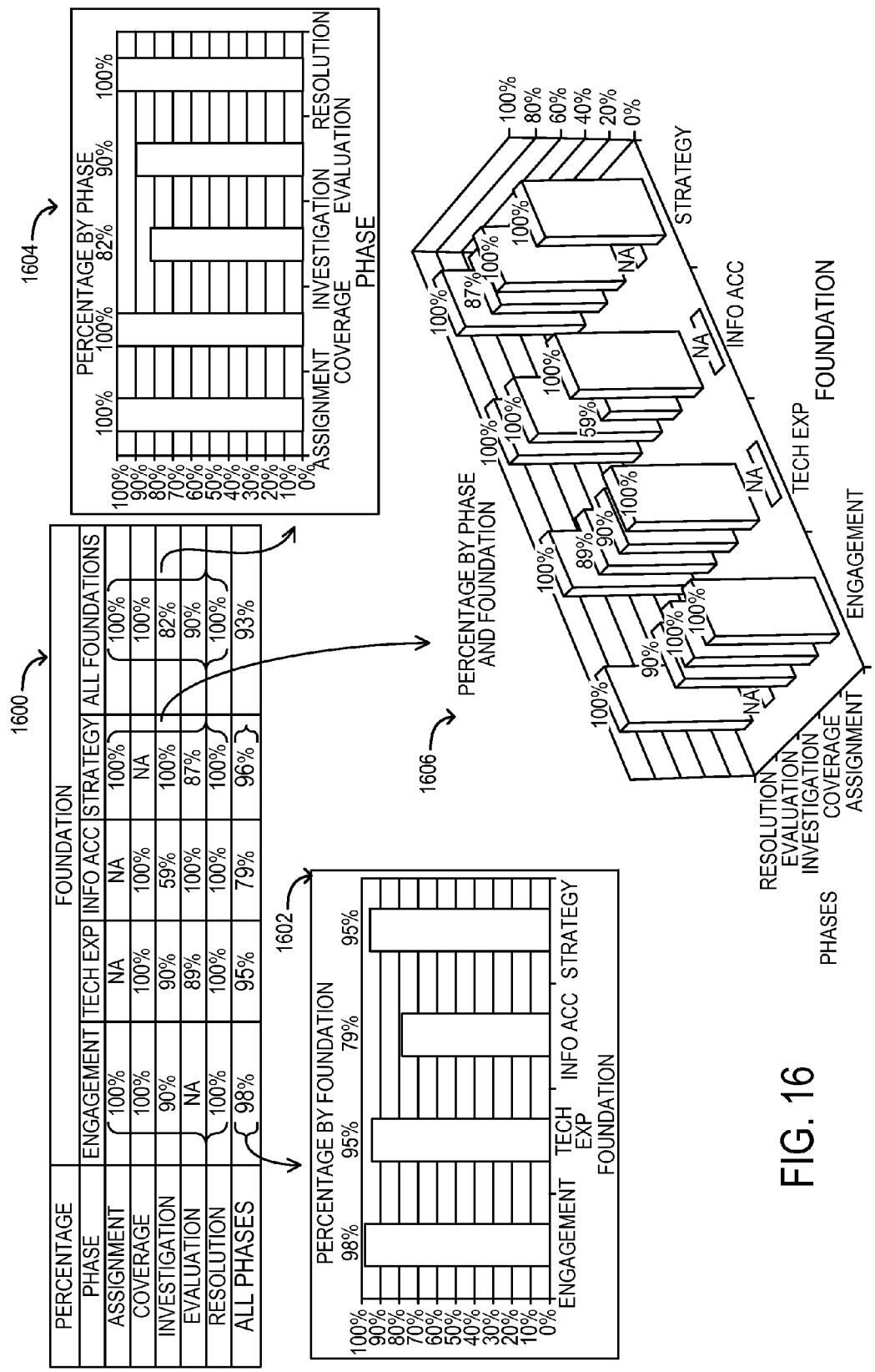
FIG. 16 depicts review scoring reports according to some embodiments of the present invention.

FIG. 16 depicts some example reports and/or interfaces, or file "score cards," that, in accordance with some embodiments, may be produced by a file review rating engine and may be useful for outputting or otherwise presenting results of a file review, or rating of the handling of a file. The example foundation percentage per phase table 1600 indicates, for each phase and each foundation, how well the handling of a claim reflects the quality measures (i.e., the foundations) across each of the identified phases of the claim handling workflow (and for the handling of the claim as a whole). The example percentage by foundation graph 1602 charts the actual foundation scores earned as percentages of the maximum potential foundation scores in the file review. The example percentage by phase graph 1604 similarly charts the actual phase scores earned as percentages of the maximum potential phase level scores. The example percentage by phase and foundation graph 1606 represents the data of table 1600 in three dimensions: phase, foundation, and percentage by phase and foundation.

FIG. 17 indicates an example user interface 1700, in the context of the example insurance claim file review process, which may be useful, in accordance with some embodiments, for initiating, viewing, and/or editing file reviews of various types. The example interface, for example, allows a user to create a new file review (e.g., using the Create button) by selecting one or more of a line of business, a review type, a questionnaire, a primary reviewee (e.g., a file handler whose work is being reviewed), and a status of the primary reviewee. A user may also view a list of existing reviews, and may choose to modify, view, validate, cancel, print, and/or indicate a financial or significant issue with, one or more of the existing file reviews.

FIG. 18 indicates an example user interface 1800 that may be useful, in accordance with some embodiments, for providing a file review questionnaire with respect to one or more phases of a workflow. The example interface 1800 includes user-selectable elements (e.g., checkboxes, radio buttons) for responding to file review questions, indicating whether one or more file review criteria were met with respect to an indicated file handling activity, responding to one or more core topic questions, triggering one or more sets of questions for complex or special issues, and/or responding to one or more complexity topic questions. In the example interface 1800, a user has indicated that the initial assignment of the claim met the file review criteria of "Engagement" and "Strategy" for representative core questions asked of all claim reviews (e.g., with respect to the example Assignment phase). Also in the example interface 1800, a user has indicated (e.g., by selecting a corresponding checkbox using an input device) that "Reassignment and Referral" issues are relevant to the claim file. Accordingly, based on this indicated characteristic of the claim, the reviewer has been presented with at least one question under the Reassignment and Referral section directed to that claim handling topic.

FIG. 19 indicates an example user interface 1900 that may be useful, in accordance with some embodiments, for validating and/or presenting information about validation of responses to a file review. For example, user interface 1900 includes alerts (e.g., balloon call-outs) indicating that required information (e.g., answers with respect to certain foundations) has not been provided for indicated questions.

FIG. 20 indicates an example user interface 2000 that may be useful, in accordance with some embodiments, for indicating significant and/or financial issues with a file. Such indications may be used in some embodiments for triggering a notification process by which one or more messages are transmitted to one or more professionals associated with a file, based on the information input during the file review. In one example, the interface 2000 allows a file reviewer to trigger a notification when a financial or other significant event is noted on the file. In some embodiments, a claim handler and the claim handler's supervisor may be notified via a notification system that action is required for resolving the events identified.

Figure 22:
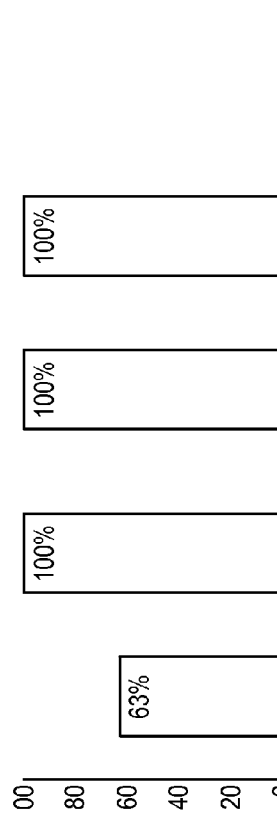
FIG. 22 depicts an example user interface according to some embodiments of the present invention.

FIG. 21 indicates an example user interface 2100 that may be useful, in accordance with some embodiments, for presenting response summary information about a review of a file. The user interface 2100 includes a graphical representation of total responses, total responses not meeting file review criteria, and total responses meeting file review criteria, and percentages of the maximum potential review score, per phase of an example insurance claim workflow. Such response summary information may be useful, in some embodiments, to provide to the file handler whose work is being reviewed as feedback on the handler's work and/or as the basis for a file reviewer to provide feedback to the file handler. FIG. 22 indicates an example user interface 2200 that may be useful, in accordance with some embodiments, for presenting score summary information based on a review of a file. The user interface 2200 includes a graphical representation of percentages per file review criterion (e.g., "foundation") at the file level, for an example insurance claim file. The example user interface 2200 may, for example, present results calculated using a rating engine, as described with respect to various embodiments in this disclosure, based on relative question weightings and/or adjustments to maximum potential review scores based on one or more non-applicable questions.

Although interfaces 1700, 1800, 1900, 2000, 2100, and 2200 are illustrated for convenience of discussion as different interfaces, those skilled in the art will readily understand, in light of the present disclosure, that the features and information of those interfaces, or a subset of such features and information, may be included in a single interface, screen display or application window, or in more than the depicted number of interfaces, displays or application windows. Although the example interfaces are illustrated as including particular text and interface elements (e.g., text descriptions, fields for data entry or display), it will be understood by those skilled in the art, in light of the present disclosure, that not all of the example interface features and elements depicted are necessary and that additional features and elements may be provided, in accordance with some embodiments, as deemed desirable for a particular implementation.

According to some embodiments, multiple reviews on the same handler may be summarized by unweighted average of percentages at the file level. An average percentage may refer to the average of percentages for all files. An unweighted average of the percentages treats all files equally, regardless of their respective maximum potential scores.

According to some embodiments, some types of topics of issue categories have an associated trigger and at least one associated question.

In some embodiments, one or more questions associated with a particular topic may be a stand-alone question that does not depend logically on an answer to another question (or questions). Alternatively, or in addition, the presentation of one or more questions and/or the response to one or more questions may be dependent on the responses to one or more other questions. In some embodiments, if the answer to a question matches a first predetermined answer, a second predetermined answer may be associated automatically to one or more other questions. For instance, an answer of "NO" or "NOT APPLICABLE" to a parent question may set all corresponding child questions to "NO" or "NOT APPLICABLE."

In some embodiments, an answer to a first question satisfies a trigger for at least one other question and may result in the presentation of the at least one other question and/or a particular topic of questions. For example, a file reviewer may indicate that a complex issue is applicable to a file, and as a result one or more questions specific to the complexity are presented to the file reviewer.

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

Applicants have recognized that it may be advantageous, in accordance with some embodiments, to provide for a file review rating method that allows a user or organization to establish priority weights for various objectives, criteria, and other parameters.

Applicants have recognized that it may be advantageous, in accordance with some embodiments, to provide for a file review rating method that is based on an analytic hierarchy process (AHP).

Applicants have recognized that it may be advantageous, in accordance with some embodiments, to provide for a file review rating method that is based on a hierarchy of criteria levels, including at least a first criteria level (e.g., a phase level) and a second criteria level (e.g., a topic level).

Applicants have recognized that it may be advantageous, in accordance with some embodiments, to provide a process for generating a questionnaire allowing for respective weighting of a plurality of questions based on one or more criteria levels (e.g., phases, sub-phases, and/or foundations).

According to one example implementation, a file review rating system for evaluating the handling of a file may be generated by identifying one or more types of actions or activities on the file to review, identifying criteria for assessing whether each action was completed satisfactorily or not, identifying one or more qualities or overall business goals, assigning relative weights to the overall business goals, and determining a relative rating of the handling of the file with respect to one or more of the business goals, based on whether each action was completed satisfactorily or not and the respective, relative weighting of that goal. Optionally, each type of action also may be given a relative weight (e.g., within a particular action category).

In one example embodiment, an insurance provider develops a file review questionnaire for rating how activities associated with an insurance claim file contributed to various measures of quality for claim handling. Two or more activity or workflow categories, referred to as "phases" in this disclosure, may be identified. One or more topics or activity sub-categories may be identified within one or more of the activity categories. In one example, a first set of topics may comprise "core" actions that are generally applicable to all files, and a second set of topics may comprise one or more non-core actions (which may be referred to as "complexities" in this disclosure) that typically apply to some files but not to others. in one instance, a questionnaire is divided into five main activity categories reflecting the main workflow "phases" in handling a claim: assignment, coverage, investigation, evaluation, and resolution. Each phase is given a relative weight reflecting the perceived importance to claim handling overall. For instance, the resolution phase of handling a claim may be considered relatively more important in assessing the handling of the claim overall than how efficiently the claim was assigned during an initial assignment phase. Different activities within each phase are further identified by specific questions directed to assessing whether the activity was successfully completed (e.g., "Was pertinent/factual information obtained and documented in the claim file?"). Some questions ("core" questions) may be generally applicable to all files; other types of questions may be relevant to only certain types of files (reflecting one or more file "complexities"). For instance, consideration of fraud and/or arson concerns may be relevant to the handling of some insurance claims, but not others, and special questions may be derived for addressing this complexity. In this example insurance scenario, each topic (e.g., core, fraud/arson, subrogation) may be assigned a relative weight (e.g., within its phase). Further, according to the example embodiment, each question is assigned a relative weight within its topic, and that relative weight is further distributed across any applicable business goals, which may be referred to as "foundations" in this insurance example. In this example, the example foundations for the example insurance provider include customer engagement (CE), technical skills (TS), information accuracy (IA), and file strategy (FS). The file review questionnaire method, according to some embodiments, may be useful in measure or otherwise assess how the handling of one or more claim files advances, or deviates from, one or more of the identified business goals. In one example, the response to a question in the questionnaire may be rated based on a number of credits assigned to that response (e.g., for meeting a criteria expressed in the question) relative to the total maximum potential credits (e.g., as a percentage rating).

According to a method in accordance with some embodiments, the relative importance of each question to a particular phase is established. For example, a panel of experts familiar with particular workflow phases and/or one or more activities within a phase may be consulted to develop the relative weightings for a workflow process.

According to a method in accordance with some embodiments, one or more questions are identified as not being applicable with respect to a given file. A maximum potential review score is determined for the non-applicable question and the maximum potential score of at least one other question is adjusted based on the maximum potential review score of the non-applicable question.

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting.

The term "insurance carrier" or "carrier", as used in this disclosure, may refer to an insurance company or self-insured group or entity providing insurance coverage.

The term "claimant", as used in this disclosure, may refer to an entity or person who has submitted a claim for benefits to a carrier, including an entity or person claiming to have suffered a loss or injury, a spouse or dependent(s) of a deceased person who claim benefits due to a loss by or injury to the deceased person. In one example, a claimant may be an employee claiming to have been injured in the course and scope of his employment for an insured employer of a carrier.

As used in this disclosure, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used in this disclosure, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used in this disclosure a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

As used in this disclosure, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described in this disclosure are associated with an "indication". As used in this disclosure, the term "indication" may be used to refer to any indicia and/or other information indicative of or associated with a subject, item, entity, and/or other object and/or idea. As used in this disclosure, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used in this disclosure is an area that conveys information to a viewer. The information may be dynamic, in which case, an LCD, LED, CRT, Digital Light Processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as Standard Definition Television (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch screen features or associated keypads as is well understood.

The present disclosure may refer to a "control system". A control system, as that term is used in this disclosure, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

When a single device or article is described in this disclosure, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described in this disclosure (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, and described methods may be depicted (e.g., in one or more flowcharts) as steps connected by directional arrows, such processes may be configured to work in different orders. In other words, any sequence or order of steps that may be explicitly described or depicted does not necessarily indicate a requirement that the steps be performed in that order. The steps of processes described in this disclosure may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

It will be readily apparent that the various methods and algorithms described in this disclosure may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented in this disclosure are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described in this disclosure. Further, despite any depiction of the databases as tables, other formats (including relational databases, object-based models, hierarchical electronic file structures, and/or distributed databases) could be used to store and manipulate the data types described in this disclosure. Likewise, object methods or behaviors of a database can be used to implement various processes, such as those described in this disclosure. In addition, the databases may, in a known manner, be stored locally or remotely from a device that accesses data in such a database. Furthermore, while unified databases may be contemplated, it is also possible that the databases may be distributed and/or duplicated amongst a variety of devices.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

It will be readily apparent that the various methods and algorithms described in this disclosure may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

The invention claimed is:

1. A method, comprising:
   determining, by a computer comprising at least one processor and in accordance with a file review application, a plurality of file review questions for reviewing a file, each file review question being associated in a database with at least one file review criterion;
   determining, by the computer in accordance with the file review application, a maximum potential review score for a first file review question of the plurality of file review questions;
   receiving, by the computer in accordance with the file review application, an indication that a second file review question of the plurality of file review questions is not applicable to the file;
   determining, by the computer in accordance with the file review application, a maximum potential review score for the second file review question;
   determining, by the computer in accordance with the file review application, an adjusted maximum potential review score for the first file review question based on the maximum potential review score for the non-applicable second file review question;
   determining, by the computer in accordance with the file review application, a response to the first file review question;
   determining, by the computer in accordance with the file review application, a review score based on:
     the response, and
     the adjusted maximum potential review score; and
   outputting an indication of the review score via a user interface.

2. The method of claim 1, further comprising:
   determining a first file review criterion of the at least one file review criterion;
   wherein determining the review score comprises determining the review score based on:
     the first file review criterion,
     the response, and
     the adjusted maximum potential review score.

3. The method of claim 2, further comprising:
   determining a portion of the adjusted maximum potential review score that is associated with the first file review criterion.

4. The method of claim 3, wherein determining the review score comprises:
   determining the review score based on:
     the response, and
     the portion of the adjusted maximum potential review score that is associated with the first file review criterion.

5. The method of claim 3, wherein determining the review score comprises:
   determining a numerical value associated with the response;
   determining a numerical value representative of the portion of the adjusted maximum potential review score that is associated with the first file review criterion; and
   generating a review score for the first file review question by multiplying the numerical value associated with the response by the numerical value representative of the portion of the adjusted maximum potential review score.

6. The method of claim 1, further comprising:
   determining, by the computer in accordance with the file review application, a maximum potential review score for a third file review question of the plurality of file review questions; and
   determining, by the computer in accordance with the file review application, a response to the third file review question;
   wherein determining the review score comprises determining, by the computer in accordance with the file review application, a review score for the file based on:
      the response to the first file review question,
      the adjusted maximum potential review score for the first file review question,
      the response to the third file review question, and
      the maximum potential review score for the third file review question.

7. The method of claim 6, wherein the maximum potential review score for the third file review question is an adjusted maximum potential review score based on non-applicability of at least one other file review question.

8. The method of claim 6, wherein determining the review score for the file comprises determining a ratio comparing (i) a combination of the respective review scores for the first and third file review questions to (ii) a combination of the adjusted maximum potential review score for the first file review question and the maximum potential review score for the third file review question.

9. The method of claim 1, further comprising:
   determining a first workflow phase associated with at least two file review questions, including the first file review question; and
   wherein determining the review score comprises determining a review score for the first workflow phase.

10. The method of claim 9, further comprising:
    determining a second workflow phase associated with at least two file review questions, wherein the second workflow phase is different than the first workflow phase; and
    determining a review score for the second workflow phase.

11. An apparatus comprising:
    a processor;
    at least one output device in communication with the processor; and
    a computer-readable memory in communication with the processor, the computer-readable memory storing file review instructions that when executed by the processor result in:
       determining a plurality of file review questions for reviewing a file, each file review question being associated in a database with at least one file review criterion;
       determining a maximum potential review score for a first file review question of the plurality of file review questions;
       receiving an indication that a second file review question of the plurality of file review questions is not applicable to the file;
       determining a maximum potential review score for the second file review question;
       determining an adjusted maximum potential review score for the first file review question based on the maximum potential review score for the non-applicable second file review question;
       determining a response to the first file review question;
       determining a review score based on:
          the response, and
          the adjusted maximum potential review score; and
       outputting an indication of the review score via one or more of the at least one output device.

12. The apparatus of claim 11, wherein the file review instructions when executed by the processor further result in:
    determining a first file review criterion of the at least one file review criterion;
    wherein determining the review score comprises determining the review score based on:
       the first file review criterion,
       the response, and
       the adjusted maximum potential review score.

13. The apparatus of claim 12, wherein the file review instructions when executed by the processor further result in:
    determining a portion of the adjusted maximum potential review score that is associated with the first file review criterion.

14. The apparatus of claim 13, wherein determining the review score comprises:
    determining the review score based on:
       the response, and
       the portion of the adjusted maximum potential review score that is associated with the first file review criterion.

15. The apparatus of claim 13, wherein determining the review score comprises:
    determining a numerical value associated with the response;
    determining a numerical value representative of the portion of the adjusted maximum potential review score that is associated with the first file review criterion; and
    generating a review score for the first file review question by multiplying the numerical value associated with the response by the numerical value representative of the portion of the adjusted maximum potential review score.

16. The apparatus of claim 11, wherein the file review instructions when executed by the processor further result in:
    determining a maximum potential review score for a third file review question of the plurality of file review questions;
    determining a response to the third file review question; and
    wherein determining a review score comprises determining a review score for the file based on:
       the response to the first file review question,
       the adjusted maximum potential review score for the first file review question,
       the response to the third file review question, and
       the maximum potential review score for the third file review question.

17. A non-transitory computer-readable memory storing instructions that, when executed by a computer comprising at least one processor, result in:
    determining, by a computer comprising at least one processor and in accordance with a file review application, a plurality of file review questions for reviewing a file, each file review question being associated in a database with at least one file review criterion;

determining, by the computer in accordance with the file review application, a maximum potential review score for a first file review question of the plurality of file review questions;

receiving, by the computer in accordance with the file review application, an indication that a second file review question of the plurality of file review questions is not applicable to the file;

determining, by the computer in accordance with the file review application, a maximum potential review score for the second file review question;

determining, by the computer in accordance with the file review application, an adjusted maximum potential review score for the first file review question based on the maximum potential review score for the non-applicable second file review question;

determining, by the computer in accordance with the file review application, a response to the first file review question;

determining, by the computer in accordance with the file review application, a review score based on:
the response, and
the adjusted maximum potential review score; and outputting an indication of the review score via a user interface.

* * * * *